(12) United States Patent
Kawashima

(10) Patent No.: US 11,040,705 B2
(45) Date of Patent: Jun. 22, 2021

(54) WINDSHIELD WIPER CONNECTOR

(71) Applicant: Pylon Manufacturing Corp., Deefield Beach, FL (US)

(72) Inventor: Hiroshi Kawashima, Sunrise, FL (US)

(*) Notice: Subject to any disclaimer, the term of this patent is extended or adjusted under 35 U.S.C. 154(b) by 0 days.

(21) Appl. No.: 16/005,114

(22) Filed: Jun. 11, 2018

(65) Prior Publication Data

US 2018/0290630 A1    Oct. 11, 2018

Related U.S. Application Data

(63) Continuation-in-part of application No. 15/600,254, filed on May 19, 2017, now abandoned.

(60) Provisional application No. 62/338,834, filed on May 19, 2016.

(51) Int. Cl.
B60S 1/40 (2006.01)

(52) U.S. Cl.
CPC ............ B60S 1/4003 (2013.01); B60S 1/407 (2013.01); B60S 1/4041 (2013.01); B60S 1/4048 (2013.01); B60S 2001/4051 (2013.01); B60S 2001/4054 (2013.01)

(58) Field of Classification Search
CPC .... B60S 1/3429; B60S 1/4003; B60S 1/4038; B60S 1/4045; B60S 1/4048; B60S 1/3867; B60S 2001/4051; B60S 2001/4054; B60S 1/407; B60S 1/4041
USPC ...................................................... 15/250.32
See application file for complete search history.

(56) References Cited

U.S. PATENT DOCUMENTS

| 248,388 A | 10/1881 | Barnes |
| 253,040 A | 1/1882 | Hale |
| 253,167 A | 1/1882 | Lidren |
| 282,243 A | 7/1883 | Venator et al. |
| 282,718 A | 8/1883 | Griffin |
| 295,020 A | 3/1884 | Knight |
| D56,762 S | 12/1920 | Miner |
| 2,310,751 A | 2/1943 | Scinta |
| 2,550,094 A | 4/1951 | Smulski |
| 2,589,339 A | 3/1952 | Carson |
| 2,616,112 A | 11/1952 | Smulski |
| 2,643,411 A | 6/1953 | Nessen |
| 2,658,223 A | 11/1953 | Enochian |

(Continued)

FOREIGN PATENT DOCUMENTS

| AU | 2006241297 A1 | 6/2007 |
| AU | 2006203445 A1 | 10/2007 |

(Continued)

OTHER PUBLICATIONS

Machine translation of description portion of WO publication 2005039944, published May 2005. (Year: 2005).*

*Primary Examiner* — Gary K. Graham
(74) *Attorney, Agent, or Firm* — The Brickell IP Group, PLLC; Javier Sobrado; Arthur Robert Weaver

(57) ABSTRACT

A connector for a windshield wiper, and a wiper blade assembly including same, that accommodates slotted receiving portions of windshield wiper arms. The connector for connecting a windshield wiper assembly to a wiper arm may have a peripheral wall having at least two opposing peripheral side walls and a top surface extending from one of the two opposing peripheral side walls to the other. The opposing peripheral side walls may each have a guide pin aligned with one another and sized to be capable of slidably engaging slots of windshield wiper arm.

20 Claims, 15 Drawing Sheets

(56) References Cited

U.S. PATENT DOCUMENTS

| | | |
|---|---|---|
| 2,799,887 A | 7/1957 | Nemic |
| 2,814,820 A | 12/1957 | Elliot et al. |
| 2,890,472 A | 6/1959 | Olson |
| 2,932,843 A | 4/1960 | Zaiger et al. |
| 2,937,393 A | 5/1960 | Brueder |
| 2,946,078 A | 7/1960 | Deibel et al. |
| 3,029,460 A | 4/1962 | Hoyler |
| 3,056,991 A | 10/1962 | Smithers |
| 3,082,464 A | 3/1963 | Smithers |
| 3,088,155 A | 5/1963 | Smithers |
| 3,089,174 A | 5/1963 | Bignon |
| 3,104,412 A | 9/1963 | Hinder |
| 3,116,510 A | 1/1964 | Oishei et al. |
| 3,132,367 A | 5/1964 | Wise |
| 3,139,644 A | 7/1964 | Smith |
| 3,147,506 A | 9/1964 | Williams |
| 3,147,507 A | 9/1964 | Glynn |
| 3,192,551 A | 7/1965 | Appel |
| 3,234,578 A | 2/1966 | Goulb et al. |
| 3,296,647 A | 1/1967 | Gumbleton |
| 3,317,945 A | 5/1967 | Ludwig |
| 3,317,946 A | 5/1967 | Anderson |
| 3,350,738 A | 11/1967 | Anderson |
| D211,570 S | 7/1968 | Tomlin |
| 3,405,421 A | 10/1968 | Tomlin |
| 3,418,679 A | 12/1968 | Barth et al. |
| 3,480,986 A | 12/1969 | Forster |
| 3,588,941 A | 6/1971 | Schlesinger |
| 3,588,942 A | 6/1971 | Schlesinger |
| 3,618,155 A | 11/1971 | Mower |
| 3,665,544 A | 5/1972 | Sakamoto |
| 3,673,631 A | 7/1972 | Yamadai et al. |
| 3,685,086 A | 8/1972 | Froehlich |
| 3,751,754 A | 8/1973 | Quinlan et al. |
| 3,757,377 A | 9/1973 | Hayhurst |
| 3,780,395 A | 12/1973 | Quinlan et al. |
| 3,857,741 A | 12/1974 | Hultgren et al. |
| 3,862,465 A | 1/1975 | Ito |
| 3,872,535 A | 3/1975 | Arman |
| 3,872,537 A | 3/1975 | Bianchi |
| 3,879,793 A | 4/1975 | Schlegel |
| 3,879,794 A | 4/1975 | Roberts, Jr. |
| 3,881,213 A | 5/1975 | Tilli |
| 3,881,214 A | 5/1975 | Palu |
| D236,337 S | 8/1975 | Deibel |
| 3,929,222 A | 12/1975 | Smith et al. |
| 3,942,212 A | 3/1976 | Steger et al. |
| 3,969,784 A | 7/1976 | Journee |
| D240,809 S | 8/1976 | Deibel |
| 3,995,347 A | 12/1976 | Kohler |
| 4,007,511 A | 2/1977 | Deibel |
| 4,009,504 A | 3/1977 | Arman |
| 4,028,770 A | 6/1977 | Appel |
| 4,047,480 A | 9/1977 | Vassiliou |
| 4,063,328 A | 12/1977 | Arman |
| D248,375 S | 7/1978 | Bergstein |
| 4,102,003 A | 7/1978 | Hancu |
| 4,120,069 A | 10/1978 | Sharp et al. |
| 4,127,912 A | 12/1978 | Deibel et al. |
| 4,127,916 A | 12/1978 | van den Berg et al. |
| D257,339 S | 10/1980 | Ellinwood |
| 4,239,104 A | 12/1980 | Roccaforte et al. |
| 4,286,351 A * | 9/1981 | Mower ............... B60S 1/3801 15/250.32 |
| 4,308,635 A | 1/1982 | Maiocco |
| 4,309,790 A | 1/1982 | Bauer et al. |
| 4,324,019 A | 4/1982 | Mohnach et al. |
| 4,327,458 A | 5/1982 | Maiocco |
| 4,334,001 A | 6/1982 | Horie et al. |
| 4,339,839 A | 7/1982 | Knights |
| 4,342,126 A | 8/1982 | Neefeldt |
| 4,343,063 A | 8/1982 | Batt |
| 4,343,064 A | 8/1982 | van den Berg et al. |
| 4,354,293 A | 10/1982 | Le Sausse et al. |
| D267,939 S | 2/1983 | Duvoux |
| D267,940 S | 2/1983 | Duvoux |
| D268,020 S | 2/1983 | Duvoux |
| 4,400,845 A | 8/1983 | Noguchi et al. |
| 4,416,032 A | 11/1983 | Mohnach et al. |
| 4,422,207 A | 12/1983 | Maiocco et al. |
| 4,438,543 A | 3/1984 | Noguchi et al. |
| 4,464,808 A | 8/1984 | Berry |
| 4,547,925 A | 10/1985 | Blackborow et al. |
| 4,561,143 A | 12/1985 | Beneteau |
| 4,570,284 A | 2/1986 | Verton |
| 4,587,686 A | 5/1986 | Thompson |
| 4,590,638 A | 5/1986 | Beneteau |
| D286,499 S | 11/1986 | Moreno |
| D287,709 S | 1/1987 | Mower et al. |
| 4,649,591 A | 3/1987 | Guerard |
| 4,670,284 A | 6/1987 | Berkoff |
| 4,670,934 A | 6/1987 | Epple et al. |
| 4,741,071 A | 5/1988 | Bauer et al. |
| D296,317 S | 6/1988 | Mower et al. |
| 4,760,934 A | 8/1988 | Netsch |
| 4,766,636 A | 8/1988 | Shinpo |
| D298,116 S | 10/1988 | Sussich |
| 4,782,547 A | 11/1988 | Mohnach |
| D298,926 S | 12/1988 | Rusnak |
| 4,795,288 A | 1/1989 | Sakai |
| 4,807,326 A | 2/1989 | Arai et al. |
| D301,329 S | 5/1989 | Cavicchioli |
| 4,852,206 A | 8/1989 | Fisher |
| D304,709 S | 11/1989 | Sussich |
| D307,408 S | 4/1990 | Mower et al. |
| D308,352 S | 6/1990 | Bradley |
| D308,660 S | 6/1990 | Fisher |
| D308,845 S | 6/1990 | Charet et al. |
| 4,930,180 A | 6/1990 | Longman |
| D310,193 S | 8/1990 | Charet |
| 4,971,472 A | 11/1990 | Pethers |
| 4,976,001 A | 12/1990 | Wright |
| 4,984,325 A | 1/1991 | Arai et al. |
| 4,989,290 A | 2/1991 | Hoshino |
| 5,027,947 A | 7/1991 | Reighart |
| 5,042,106 A | 8/1991 | Maubray |
| 5,056,183 A | 10/1991 | Haney, III |
| 5,062,176 A | 11/1991 | Unterborn et al. |
| D322,053 S | 12/1991 | Bradley |
| D322,772 S | 12/1991 | Leu et al. |
| D322,952 S | 1/1992 | Wu |
| 5,082,078 A | 1/1992 | Umeda et al. |
| D323,637 S | 2/1992 | Dipple |
| D324,014 S | 2/1992 | Ruminer |
| 5,084,933 A | 2/1992 | Buechele |
| 5,086,534 A | 2/1992 | Journee |
| D324,359 S | 3/1992 | Chen |
| D324,667 S | 3/1992 | Williams |
| 5,093,954 A | 3/1992 | Kuzuno |
| D327,013 S | 6/1992 | Reighart |
| D327,461 S | 6/1992 | Nelson |
| 5,123,140 A | 6/1992 | Raymond |
| D327,667 S | 7/1992 | Mar |
| D328,061 S | 7/1992 | Su |
| 5,138,739 A | 8/1992 | Maubray |
| D329,034 S | 9/1992 | Charet et al. |
| D329,997 S | 10/1992 | Leu |
| D330,181 S | 10/1992 | Charet et al. |
| D330,691 S | 11/1992 | Leu |
| D330,696 S | 11/1992 | Alain |
| D331,036 S | 11/1992 | Isley |
| D331,037 S | 11/1992 | Hsi |
| D331,212 S | 11/1992 | Poteet |
| D331,556 S | 12/1992 | Ismert |
| 5,168,596 A | 12/1992 | Maubray |
| 5,170,527 A | 12/1992 | Lyon, II |
| D332,593 S | 1/1993 | Gerardiello et al. |
| 5,179,761 A | 1/1993 | Buechele et al. |
| 5,182,831 A | 2/1993 | Knight |
| D334,161 S | 3/1993 | Wu et al. |
| D334,549 S | 4/1993 | Esquibel |
| 5,206,969 A | 5/1993 | Patterson et al. |
| D336,739 S | 6/1993 | Wu et al. |
| 5,218,735 A | 6/1993 | Maubray |

(56) References Cited

U.S. PATENT DOCUMENTS

| | | |
|---|---|---|
| 5,228,167 A | 7/1993 | Yang |
| 5,233,721 A | 8/1993 | Yang |
| D341,561 S | 11/1993 | Heckman et al. |
| 5,257,436 A | 11/1993 | Yang |
| D342,225 S | 12/1993 | Heckman et al. |
| 5,276,937 A | 1/1994 | Lan |
| 5,283,925 A | 2/1994 | Maubray |
| D345,329 S | 3/1994 | Kanellis et al. |
| D345,330 S | 3/1994 | Yang |
| D345,537 S | 3/1994 | Bianco et al. |
| D345,538 S | 3/1994 | Bianco et al. |
| 5,289,608 A | 3/1994 | Kim |
| 5,307,536 A | 5/1994 | Lescher |
| 5,311,636 A | 5/1994 | Lee |
| 5,312,177 A | 5/1994 | Coulter |
| D347,610 S | 6/1994 | Charet et al. |
| 5,319,826 A | 6/1994 | Mower |
| 5,325,564 A | 7/1994 | Swanepoel |
| D349,877 S | 8/1994 | Oyama |
| 5,333,351 A | 8/1994 | Sato |
| D350,723 S | 9/1994 | Longazel |
| 5,349,716 A | 9/1994 | Millar |
| 5,361,896 A | 11/1994 | Yang |
| D353,354 S | 12/1994 | Oyama |
| 5,372,449 A | 12/1994 | Bauer et al. |
| 5,383,248 A | 1/1995 | Ho |
| 5,383,249 A | 1/1995 | Yang |
| 5,392,489 A | 2/1995 | Mohnach |
| D357,626 S | 4/1995 | Snow et al. |
| 5,408,719 A | 4/1995 | DeRees et al. |
| 5,412,177 A | 5/1995 | Clark |
| 5,435,041 A | 7/1995 | Ho |
| 5,454,135 A | 10/1995 | Okuya et al. |
| 5,459,900 A | 10/1995 | Mege et al. |
| 5,463,790 A | 11/1995 | Chiou et al. |
| D365,079 S | 12/1995 | Abbott et al. |
| 5,485,650 A | 1/1996 | Swanepoel |
| 5,487,205 A | 1/1996 | Scherch et al. |
| D367,839 S | 3/1996 | Abbott et al. |
| 5,497,528 A | 3/1996 | Wu |
| 5,509,166 A | 4/1996 | Wagner et al. |
| D370,199 S | 5/1996 | Kim |
| 5,519,913 A | 5/1996 | Schedule |
| D370,653 S | 6/1996 | Kim |
| D370,654 S | 6/1996 | Kim |
| D372,217 S | 7/1996 | Abbott et al. |
| 5,564,157 A | 10/1996 | Kushida et al. |
| 5,566,419 A | 10/1996 | Zhou |
| 5,568,670 A | 10/1996 | Samples et al. |
| D375,289 S | 11/1996 | Waselewski et al. |
| 5,577,292 A | 11/1996 | Blachetta et al. |
| D376,792 S | 12/1996 | Chodkiewicz |
| 5,593,125 A | 1/1997 | Storz et al. |
| D377,754 S | 2/1997 | Abbott et al. |
| 5,606,766 A | 3/1997 | Lee |
| 5,628,085 A | 5/1997 | Edele et al. |
| 5,633,932 A | 5/1997 | Davis et al. |
| D379,613 S | 6/1997 | Chen |
| 5,647,088 A | 7/1997 | Bommer et al. |
| 5,661,870 A | 9/1997 | Eustache et al. |
| 5,661,871 A | 9/1997 | Scorsiroli |
| D389,449 S | 1/1998 | Hussaini |
| D390,823 S | 2/1998 | Baranowski et al. |
| D392,612 S | 3/1998 | Jonasson et al. |
| 5,732,437 A | 3/1998 | Jonasson et al. |
| D393,619 S | 4/1998 | Jeffer et al. |
| 5,742,973 A | 4/1998 | Kessler |
| D395,271 S | 6/1998 | Kim |
| D395,864 S | 7/1998 | Stahlhut et al. |
| D395,865 S | 7/1998 | Powell et al. |
| D396,840 S | 8/1998 | Vita |
| 5,791,010 A | 8/1998 | Brady et al. |
| 5,819,361 A | 10/1998 | Merkel et al. |
| 5,836,110 A | 11/1998 | Buening |
| D402,953 S | 12/1998 | Kim |
| D404,354 S | 1/1999 | Witek et al. |
| D406,094 S | 2/1999 | Lai |
| D406,257 S | 3/1999 | Lee |
| D406,755 S | 3/1999 | Garganese |
| D406,756 S | 3/1999 | Garganese |
| 5,875,672 A | 3/1999 | Fourie et al. |
| 5,885,023 A | 3/1999 | Witek et al. |
| 5,889,334 A | 3/1999 | Hongo |
| 5,899,334 A | 5/1999 | Domerchie et al. |
| D411,161 S | 6/1999 | Wooten |
| D411,504 S | 6/1999 | Hsu |
| 5,907,885 A | 6/1999 | Tilli et al. |
| 5,911,358 A | 6/1999 | Kenner et al. |
| 5,920,947 A | 7/1999 | Varner |
| D413,261 S | 8/1999 | Yerich |
| D414,456 S | 9/1999 | Hussaini et al. |
| 5,970,569 A | 10/1999 | Merkel et al. |
| 5,970,570 A | 10/1999 | Groninger |
| D417,180 S | 11/1999 | Shih |
| D418,103 S | 12/1999 | Don |
| D418,474 S | 1/2000 | Witek et al. |
| D419,950 S | 2/2000 | Spector |
| 6,026,537 A | 2/2000 | Hojnaoki |
| 6,055,697 A | 5/2000 | Wellenschlaeger |
| 6,063,216 A | 5/2000 | Damm et al. |
| D427,134 S | 6/2000 | Lee |
| 6,070,723 A | 6/2000 | Lewis |
| 6,088,872 A | 7/2000 | Schmid et al. |
| D430,097 S | 8/2000 | Breesch et al. |
| 6,101,665 A | 8/2000 | Sahara et al. |
| D431,223 S | 9/2000 | Breesch et al. |
| 6,119,301 A | 9/2000 | Nakatsukasa et al. |
| D431,520 S | 10/2000 | Breesch et al. |
| D432,072 S | 10/2000 | Breesch et al. |
| D434,715 S | 12/2000 | Wang |
| 6,158,078 A | 12/2000 | Kotlarski |
| 6,161,248 A | 12/2000 | Merkel et al. |
| 6,192,546 B1 | 2/2001 | Kotlarski |
| 6,202,251 B1 | 3/2001 | Kotlarski |
| 6,216,311 B1 | 4/2001 | Van Damme et al. |
| D442,537 S | 5/2001 | Kim |
| 6,226,829 B1 | 5/2001 | Kotlarski |
| D443,245 S | 6/2001 | Kim |
| D443,582 S | 6/2001 | De Block |
| D443,854 S | 6/2001 | De Block |
| 6,247,590 B1 | 6/2001 | Baker |
| D444,760 S | 7/2001 | Houssat et al. |
| D445,754 S | 7/2001 | Benoit |
| 6,266,843 B1 | 7/2001 | Doman et al. |
| 6,279,191 B1 | 8/2001 | Kotlarski et al. |
| 6,279,746 B1 | 8/2001 | Hussaini et al. |
| D448,295 S | 9/2001 | Mozes |
| 6,286,176 B1 | 9/2001 | Westermann et al. |
| 6,292,974 B1 | 9/2001 | Merkel et al. |
| 6,295,690 B1 | 10/2001 | Merkel et al. |
| 6,301,742 B1 | 10/2001 | Kota |
| 6,305,066 B1 | 10/2001 | De Paoli et al. |
| 6,308,373 B1 | 10/2001 | Merkel et al. |
| 6,327,738 B1 | 12/2001 | Lewis |
| 6,332,236 B1 | 12/2001 | Ku |
| 6,336,243 B1 | 1/2002 | Charng |
| D453,316 S | 2/2002 | Watanabe |
| 6,363,569 B1 | 4/2002 | Kotlarski |
| 6,367,117 B1 | 4/2002 | Sahara et al. |
| D457,479 S | 5/2002 | De Block et al. |
| 6,393,654 B2 | 5/2002 | Nacamuli |
| 6,397,428 B2 | 6/2002 | Kotlarski |
| 6,415,473 B1 | 7/2002 | Rapp |
| D462,044 S | 8/2002 | Gfatter et al. |
| 6,427,282 B1 | 8/2002 | Kotlarski |
| 6,434,780 B1 | 8/2002 | Kotlarski |
| D462,262 S | 9/2002 | Leja |
| 6,449,797 B1 | 9/2002 | De Block |
| 6,453,505 B1 | 9/2002 | Terai |
| D464,012 S | 10/2002 | Hussaini et al. |
| D464,600 S | 10/2002 | Chen |
| 6,499,181 B1 | 12/2002 | Kotlarski |
| D469,731 S | 2/2003 | Geer |
| 6,513,186 B1 | 2/2003 | Zimmer |

(56) References Cited

U.S. PATENT DOCUMENTS

| | | |
|---|---|---|
| 6,516,491 B2 | 2/2003 | Merkel et al. |
| 6,523,218 B1 | 2/2003 | Kotlarski |
| D471,505 S | 3/2003 | Wang |
| 6,530,111 B1 | 3/2003 | Kotlarski |
| D472,510 S | 4/2003 | Lin |
| D473,180 S | 4/2003 | Sun |
| D473,507 S | 4/2003 | Huang |
| 6,550,096 B1 | 4/2003 | Stewart et al. |
| 6,553,607 B1 | 4/2003 | De Block |
| D474,143 S | 5/2003 | Ho |
| 6,564,441 B2 | 5/2003 | Ibe et al. |
| 6,581,237 B1 | 6/2003 | Kotlarski |
| 6,606,759 B1 | 8/2003 | Hoshino |
| 6,609,267 B1 | 8/2003 | Journee et al. |
| 6,611,988 B1 | 9/2003 | De Block |
| 6,619,094 B2 | 9/2003 | Juhl |
| 6,622,540 B2 | 9/2003 | Jones et al. |
| 6,625,842 B1 | 9/2003 | De Block |
| 6,632,738 B2 | 10/2003 | Sone |
| 6,634,056 B1 | 10/2003 | De Block |
| 6,640,380 B2 | 11/2003 | Rosenstein et al. |
| 6,643,889 B1 | 11/2003 | Kotlarski |
| 6,651,292 B2 | 11/2003 | Komerska |
| 6,665,904 B1 | 12/2003 | Kerchaert |
| 6,668,419 B1 | 12/2003 | Kotlarski |
| 6,675,433 B1 | 1/2004 | Stewart et al. |
| 6,675,434 B1 | 1/2004 | Wilhelm et al. |
| 6,681,440 B2 | 1/2004 | Zimmer et al. |
| D487,047 S | 2/2004 | Kim |
| 6,687,948 B2 | 2/2004 | Kotlarski |
| 6,718,594 B1 | 4/2004 | Kotlarski |
| D490,763 S | 6/2004 | Kim |
| 6,766,906 B2 | 6/2004 | Charng |
| D494,125 S | 8/2004 | Leu |
| D494,527 S | 8/2004 | Hsu |
| D494,528 S | 8/2004 | Chiang |
| 6,785,931 B2 | 9/2004 | Lee et al. |
| 6,789,289 B2 | 9/2004 | Roodt |
| 6,792,644 B2 | 9/2004 | Roodt |
| 6,796,000 B2 | 9/2004 | Varner |
| 6,806,452 B2 | 10/2004 | Bos et al. |
| 6,810,555 B2 | 11/2004 | Ritt |
| 6,810,556 B1 | 11/2004 | Kotlarski |
| 6,813,803 B2 | 11/2004 | Leutsch |
| 6,813,923 B2 | 11/2004 | Jones et al. |
| 6,820,302 B2 | 11/2004 | Zimmer |
| 6,820,303 B2 | 11/2004 | Zimmer et al. |
| 6,820,304 B1 | 11/2004 | Gossez et al. |
| D499,962 S | 12/2004 | Lee et al. |
| D500,728 S | 1/2005 | Leu |
| 6,836,924 B2 | 1/2005 | Egan-Walter |
| 6,836,925 B1 | 1/2005 | Swanepoel |
| 6,836,926 B1 | 1/2005 | De Block |
| 6,836,927 B1 | 1/2005 | De Block et al. |
| D501,819 S | 2/2005 | Hsu |
| 3,037,233 A1 | 2/2005 | Peras et al. |
| 6,857,160 B2 | 2/2005 | Weiler et al. |
| 6,859,971 B2 | 3/2005 | Siklosi |
| 6,874,195 B2 | 4/2005 | Kotlarski et al. |
| 6,883,966 B2 | 4/2005 | Zimmer |
| 6,886,213 B2 | 5/2005 | Merkel et al. |
| 6,904,639 B2 | 6/2005 | Dietrich et al. |
| 6,910,243 B1 | 6/2005 | Zimmer |
| 6,910,244 B2 | 6/2005 | De Block et al. |
| D508,226 S | 8/2005 | Lin |
| D508,888 S | 8/2005 | Carroll |
| 6,944,905 B2 | 9/2005 | De Block et al. |
| 6,946,810 B2 | 9/2005 | Kohlrausch |
| 6,951,043 B1 | 10/2005 | Fehrsen |
| D511,735 S | 11/2005 | Aoyama et al. |
| 6,964,079 B2 | 11/2005 | Zimmer |
| 6,964,080 B2 | 11/2005 | Knauf |
| 6,966,096 B2 | 11/2005 | Baseotto et al. |
| D512,362 S | 12/2005 | Breesch et al. |
| 6,973,698 B1 | 12/2005 | Kotlarski |
| 6,978,511 B2 | 12/2005 | Poton |
| 6,978,512 B2 | 12/2005 | Dietrich et al. |
| 7,007,339 B2 | 3/2006 | Weiler et al. |
| 7,024,722 B2 | 4/2006 | Neubauer et al. |
| 7,036,181 B2 | 5/2006 | Zimmer |
| D522,380 S | 6/2006 | Dibnah et al. |
| 7,055,207 B2 | 6/2006 | Coughlin |
| 7,055,208 B2 | 6/2006 | Merkel et al. |
| 7,076,829 B2 | 7/2006 | Ritt |
| D527,336 S | 8/2006 | Van Baelen |
| 7,093,317 B1 | 8/2006 | Zimmer |
| 7,134,163 B2 | 11/2006 | Varner |
| 7,137,167 B2 | 11/2006 | Torii et al. |
| 7,143,463 B2 | 12/2006 | Baseotto et al. |
| 7,150,065 B2 | 12/2006 | Zimmer |
| 7,150,066 B1 | 12/2006 | Huang |
| 7,150,795 B2 | 12/2006 | Javaruski et al. |
| 7,166,979 B2 | 1/2007 | Zimmer |
| 7,171,718 B2 | 2/2007 | Moein et al. |
| D538,218 S | 3/2007 | Elwell et al. |
| 7,196,440 B2 | 3/2007 | Lamprecht |
| 7,207,082 B2 | 4/2007 | Lee |
| 7,228,588 B2 | 6/2007 | Kraemer et al. |
| D546,669 S | 7/2007 | Sheppard et al. |
| D547,713 S | 7/2007 | Goeller |
| D549,151 S | 8/2007 | Janssis et al. |
| D549,152 S | 8/2007 | Goeller |
| 7,256,565 B2 | 8/2007 | Merkel et al. |
| 7,257,856 B2 | 8/2007 | Zimmer |
| 7,258,233 B2 | 8/2007 | Lee |
| 7,272,890 B2 | 9/2007 | Zimmer et al. |
| D552,486 S | 10/2007 | Herring et al. |
| 7,281,294 B2 | 10/2007 | Wilms et al. |
| D556,118 S | 11/2007 | Claes |
| 7,293,321 B2 | 11/2007 | Breesch |
| 7,299,520 B2 | 11/2007 | Huang |
| 7,316,047 B2 | 1/2008 | Thienard |
| 7,316,048 B2 | 1/2008 | Yamane et al. |
| 7,316,087 B1 | 1/2008 | Smith |
| D564,434 S | 3/2008 | Claes |
| D564,955 S | 3/2008 | Claes |
| 7,337,900 B2 | 3/2008 | Reiber et al. |
| 7,341,396 B2 | 3/2008 | Huang |
| 7,353,562 B2 | 4/2008 | Huang |
| D569,327 S | 5/2008 | Lin |
| D569,328 S | 5/2008 | Lin |
| 7,370,385 B2 | 5/2008 | Chiang |
| D573,457 S | 7/2008 | Park |
| 7,398,577 B2 | 7/2008 | Genet |
| D575,146 S | 8/2008 | Lee |
| D577,324 S | 9/2008 | McCray |
| 7,434,291 B2 | 10/2008 | Chiang |
| D579,849 S | 11/2008 | Garrastacho et al. |
| 7,451,520 B2 | 11/2008 | Weiler et al. |
| D582,765 S | 12/2008 | Gustafson et al. |
| 7,461,429 B2 | 12/2008 | Huang |
| 7,464,433 B2 | 12/2008 | Thomar et al. |
| D584,160 S | 1/2009 | Zimmermann |
| 7,472,451 B2 | 1/2009 | Hara et al. |
| D586,663 S | 2/2009 | Tidqvist |
| D586,716 S | 2/2009 | Radfar |
| D586,717 S | 2/2009 | Depondt |
| D587,186 S | 2/2009 | Herinckx et al. |
| 7,484,264 B2 | 2/2009 | Kraemer et al. |
| 7,493,672 B2 | 2/2009 | Op't Roodt |
| D588,933 S | 3/2009 | Bonzagni et al. |
| 7,503,095 B2 | 3/2009 | Lin et al. |
| 7,506,401 B2 | 3/2009 | Park |
| 7,509,704 B2 | 3/2009 | Bauer et al. |
| 7,523,519 B2 | 4/2009 | Egner-Walter et al. |
| 7,523,520 B2 | 4/2009 | Breesch |
| 7,523,522 B2 | 4/2009 | Herring et al. |
| D592,121 S | 5/2009 | Bratec et al. |
| 7,526,832 B2 | 5/2009 | Matsumoto et al. |
| 7,527,151 B2 | 5/2009 | Park |
| D593,480 S | 6/2009 | Kim |
| D593,923 S | 6/2009 | Bratec et al. |
| 7,543,353 B2 | 6/2009 | Ko |
| 7,552,502 B2 | 6/2009 | Kagawa et al. |

(56) References Cited

U.S. PATENT DOCUMENTS

| | | |
|---|---|---|
| D596,102 S | 7/2009 | Kim |
| 7,559,110 B1 | 7/2009 | Kotlarski et al. |
| D601,077 S | 9/2009 | Kim |
| 7,581,280 B2 | 9/2009 | Op't Roodt et al. |
| 7,581,887 B2 | 9/2009 | Zimmer |
| 7,584,520 B2 | 9/2009 | Hussaini et al. |
| 7,596,479 B2 | 9/2009 | Weiler et al. |
| 7,603,741 B2 | 10/2009 | Verelst et al. |
| 7,603,742 B2 | 10/2009 | Nakano et al. |
| 7,607,194 B2 | 10/2009 | Weber et al. |
| 7,614,499 B2 | 11/2009 | Mueller |
| 7,621,016 B2 | 11/2009 | Verelst et al. |
| 7,628,560 B2 | 12/2009 | Westermann et al. |
| 7,634,833 B2 | 12/2009 | Boland et al. |
| 7,636,980 B2 | 12/2009 | Nakano |
| D608,717 S | 1/2010 | Aglassinger |
| D610,518 S | 2/2010 | Aglassinger |
| D610,519 S | 2/2010 | Aglassinger |
| D610,520 S | 2/2010 | Aglassinger |
| D611,809 S | 3/2010 | Borgerson et al. |
| 7,669,276 B2 | 3/2010 | Verelst et al. |
| 7,687,565 B2 | 3/2010 | Geilenkirchen |
| 7,690,073 B2 | 4/2010 | Marmoy et al. |
| 7,690,509 B2 | 4/2010 | Herring et al. |
| 7,699,169 B2 | 4/2010 | Lewis |
| D615,918 S | 5/2010 | Kim |
| 7,707,680 B2 | 5/2010 | Hawighorst et al. |
| 7,716,780 B2 | 5/2010 | Scholl et al. |
| 7,718,509 B2 | 5/2010 | Endo et al. |
| 7,743,457 B2 | 6/2010 | Metz |
| 7,748,076 B2 | 7/2010 | Weiler et al. |
| D621,322 S | 8/2010 | Lee et al. |
| 7,780,214 B2 | 8/2010 | Kraus et al. |
| 7,788,761 B2 | 9/2010 | Weiler et al. |
| 7,793,382 B2 | 9/2010 | Van De Rovaart |
| 7,797,787 B2 | 9/2010 | Wilms et al. |
| 7,805,800 B2 | 10/2010 | Wilms et al. |
| 7,810,206 B2 | 10/2010 | Weiler et al. |
| 7,814,611 B2 | 10/2010 | Heinrich et al. |
| D627,288 S | 11/2010 | Lee |
| 7,823,953 B2 | 11/2010 | Haas |
| 7,832,045 B2 | 11/2010 | Weiler et al. |
| 7,832,047 B2 | 11/2010 | Herinckx et al. |
| 7,836,542 B2 | 11/2010 | Dietrich et al. |
| 7,849,553 B2 | 12/2010 | Weiler et al. |
| D632,557 S | 2/2011 | Clamagirand et al. |
| 7,886,401 B2 | 2/2011 | Weber et al. |
| 7,891,043 B2 | 2/2011 | Kraus et al. |
| 7,891,044 B2 | 2/2011 | Fink et al. |
| 7,895,702 B2 | 3/2011 | Tisch et al. |
| 7,895,703 B2 | 3/2011 | Ina et al. |
| 7,898,141 B2 | 3/2011 | Hurst et al. |
| 7,899,596 B2 | 3/2011 | Zimmer et al. |
| 7,908,703 B2 | 3/2011 | van Bealen |
| 7,908,704 B2 | 3/2011 | Kraemer |
| 7,921,503 B1 | 4/2011 | Chiang |
| 7,921,504 B1 | 4/2011 | Chiang |
| 7,921,506 B2 | 4/2011 | Baek et al. |
| 7,926,659 B2 | 4/2011 | Kim |
| 7,930,796 B2 | 4/2011 | Weiler et al. |
| D637,132 S | 5/2011 | Kim |
| 7,937,798 B2 | 5/2011 | Fink et al. |
| 7,941,891 B2 | 5/2011 | Breesch |
| 7,941,892 B2 | 5/2011 | Kraus et al. |
| 7,945,985 B2 | 5/2011 | Stubner |
| 7,945,987 B2 | 5/2011 | Verelst et al. |
| 7,950,717 B2 | 5/2011 | Metz |
| 7,962,787 B2 | 6/2011 | Camilleri et al. |
| 7,966,689 B2 | 6/2011 | Rovaart et al. |
| 7,971,312 B2 | 7/2011 | Crabbee et al. |
| 7,975,849 B2 | 7/2011 | Kim |
| 7,979,950 B2 | 7/2011 | Boland |
| 7,989,955 B2 | 8/2011 | Yagi |
| 7,989,995 B2 | 8/2011 | Reith et al. |
| 7,992,248 B2 | 8/2011 | Koppen et al. |
| 7,996,953 B2 | 8/2011 | Braun et al. |
| D644,925 S | 9/2011 | Jaworski |
| 8,020,246 B2 | 9/2011 | Bauer et al. |
| 8,020,248 B2 | 9/2011 | Hasegawa |
| 8,020,249 B2 | 9/2011 | Masuda et al. |
| 8,024,836 B2 | 9/2011 | Moll et al. |
| 8,026,645 B2 | 9/2011 | Stubner et al. |
| D647,451 S | 10/2011 | Lin |
| 8,042,690 B2 | 10/2011 | Lewis |
| D647,795 S | 11/2011 | Eaton et al. |
| 8,051,526 B2 | 11/2011 | Summerville et al. |
| 8,060,976 B2 | 11/2011 | Mayer et al. |
| 8,069,528 B2 | 12/2011 | Verelst et al. |
| 8,076,807 B2 | 12/2011 | Bohn et al. |
| D651,509 S | 1/2012 | Methe et al. |
| 8,096,013 B2 | 1/2012 | Eschenbrenner et al. |
| 8,099,823 B2 | 1/2012 | Kraemer et al. |
| 8,104,134 B2 | 1/2012 | Ritt |
| 8,104,136 B2 | 1/2012 | Carangelo |
| 8,117,710 B2 | 2/2012 | Kraus et al. |
| 8,125,111 B2 | 2/2012 | Bohn et al. |
| 8,141,198 B2 | 3/2012 | Wilms et al. |
| 8,148,467 B2 | 4/2012 | Pieters et al. |
| 8,151,656 B2 | 4/2012 | Nicgorski, II |
| 8,156,604 B2 | 4/2012 | Kraus et al. |
| 8,156,605 B2 | 4/2012 | Dietrich et al. |
| 8,165,796 B2 | 4/2012 | Hoetzer |
| D658,494 S | 5/2012 | Raimer et al. |
| 8,166,605 B2 | 5/2012 | Lee |
| 8,169,791 B2 | 5/2012 | Wolf et al. |
| 8,180,518 B2 | 5/2012 | Petricoin, Jr. |
| 8,181,305 B2 | 5/2012 | Boos |
| 8,181,306 B2 | 5/2012 | Merkel |
| 8,181,307 B2 | 5/2012 | Wilms et al. |
| 8,181,308 B2 | 5/2012 | Kwon et al. |
| 8,186,002 B2 | 5/2012 | Kinnaert et al. |
| 8,191,200 B2 | 6/2012 | Kim |
| 8,191,201 B2 | 6/2012 | De Block et al. |
| 8,196,253 B2 | 6/2012 | Barlas |
| 8,196,254 B2 | 6/2012 | Mahfoudh et al. |
| 8,196,255 B2 | 6/2012 | De Block et al. |
| 8,205,290 B2 | 6/2012 | Weiler et al. |
| 8,205,291 B2 | 6/2012 | Eschenbrenner et al. |
| 8,214,965 B2 | 7/2012 | Volz et al. |
| 8,230,547 B2 | 7/2012 | Wilms et al. |
| 8,234,746 B2 | 8/2012 | Lutterodt et al. |
| 8,245,350 B2 | 8/2012 | Van De Rostyne et al. |
| 8,256,851 B2 | 9/2012 | Pelosse |
| 8,261,403 B2 | 9/2012 | Ehde |
| 8,261,405 B2 | 9/2012 | Kim et al. |
| 8,261,628 B2 | 9/2012 | Moecklin et al. |
| 8,266,759 B2 | 9/2012 | Braun et al. |
| 8,272,096 B2 | 9/2012 | Wilms et al. |
| 8,272,360 B2 | 9/2012 | Hartmann et al. |
| 8,286,533 B2 | 10/2012 | Hurst et al. |
| 8,294,327 B2 | 10/2012 | Chaumet et al. |
| D671,827 S | 12/2012 | Raimer et al. |
| 8,322,456 B2 | 12/2012 | Pozgay et al. |
| 8,327,500 B2 | 12/2012 | De Block et al. |
| 8,328,011 B2 | 12/2012 | Skurdalsvold et al. |
| 8,333,093 B2 | 12/2012 | Kleckner et al. |
| D674,733 S | 1/2013 | Lee |
| 8,341,799 B2 | 1/2013 | Koppen et al. |
| 8,347,449 B2 | 1/2013 | Genet et al. |
| 8,356,520 B2 | 1/2013 | Hurst et al. |
| 8,359,701 B2 | 1/2013 | De Block et al. |
| 8,361,595 B2 | 1/2013 | Van De Rostyne et al. |
| 8,370,986 B2 | 2/2013 | Wilms et al. |
| 8,370,987 B2 | 2/2013 | Ritt |
| 8,370,988 B2 | 2/2013 | Kraus et al. |
| 8,373,322 B2 | 2/2013 | Wegner et al. |
| 8,375,503 B2 | 2/2013 | znag |
| 8,381,348 B2 | 2/2013 | Egner-Walter et al. |
| 8,381,349 B2 | 2/2013 | Ku |
| 8,381,350 B2 | 2/2013 | Op't Roodt et al. |
| 8,397,340 B2 | 3/2013 | Weiler et al. |
| 8,397,341 B2 | 3/2013 | Ehde |
| D679,234 S | 4/2013 | Depondt |
| D679,235 S | 4/2013 | Depondt |

(56) References Cited

U.S. PATENT DOCUMENTS

| | | |
|---|---|---|
| D680,051 S | 4/2013 | Tolentino et al. |
| 8,410,651 B2 | 4/2013 | Lauk |
| 8,413,291 B2 | 4/2013 | Wu |
| 8,413,292 B2 | 4/2013 | Yang et al. |
| 8,418,644 B2 | 4/2013 | Fiedor et al. |
| 8,424,149 B2 | 4/2013 | Coemans et al. |
| 8,429,786 B2 | 4/2013 | Van Baelen et al. |
| 8,434,621 B2 | 5/2013 | Hun et al. |
| 8,448,289 B2 | 5/2013 | Reith et al. |
| 8,448,290 B2 | 5/2013 | Op't Roodt et al. |
| D684,862 S | 6/2013 | DiFranza |
| 8,453,292 B2 | 6/2013 | Jeon |
| D685,260 S | 7/2013 | Thielemier |
| D686,912 S | 7/2013 | Ehde et al. |
| 8,474,088 B2 | 7/2013 | Wu |
| 8,484,794 B2 | 7/2013 | Westermann et al. |
| 8,490,239 B2 | 7/2013 | Ehde |
| 8,495,787 B2 | 7/2013 | Garrastecho et al. |
| 8,499,408 B2 | 8/2013 | Boland |
| 8,505,151 B2 | 8/2013 | Depondt et al. |
| 8,505,152 B2 | 8/2013 | Boland |
| 8,505,724 B2 | 8/2013 | Bult et al. |
| 8,510,895 B2 | 8/2013 | Beelen et al. |
| 8,510,897 B2 | 8/2013 | Ku |
| 8,510,898 B2 | 8/2013 | Ku |
| 8,522,393 B2 | 9/2013 | Boland |
| 8,539,634 B2 | 9/2013 | Wilms et al. |
| 8,544,136 B2 | 10/2013 | Kraemer et al. |
| 8,544,137 B2 | 10/2013 | Thienard |
| 8,549,695 B2 | 10/2013 | Reith et al. |
| 8,552,113 B2 | 10/2013 | Pieters et al. |
| 8,555,455 B2 | 10/2013 | Boland |
| 8,555,456 B2 | 10/2013 | Ehde |
| 8,561,717 B2 | 10/2013 | Pozgay et al. |
| D692,750 S | 11/2013 | Ehde et al. |
| D692,818 S | 11/2013 | Tolentino et al. |
| D692,819 S | 11/2013 | Tolentino et al. |
| D693,213 S | 11/2013 | Lee et al. |
| 8,574,791 B2 | 11/2013 | Maus et al. |
| 8,575,078 B2 | 11/2013 | Duval et al. |
| 8,581,530 B2 | 11/2013 | Tisch |
| 8,582,809 B2 | 11/2013 | Halimen et al. |
| 8,584,303 B2 | 11/2013 | Wolfgarten et al. |
| 8,590,097 B2 | 11/2013 | Bohn et al. |
| D695,632 S | 12/2013 | Akana et al. |
| 8,595,888 B2 | 12/2013 | Op't Roodt et al. |
| 8,595,889 B2 | 12/2013 | Op't Roodt et al. |
| 8,613,357 B2 | 12/2013 | Putnam |
| D697,790 S | 1/2014 | Iwegbu |
| 8,646,181 B2 | 2/2014 | Baumann et al. |
| D700,524 S | 3/2014 | Ferriter |
| 8,661,602 B2 | 3/2014 | Op't Roodt et al. |
| D702,619 S | 4/2014 | Kim |
| 8,686,612 B2 | 4/2014 | Roos et al. |
| 8,707,506 B1 | 4/2014 | Wu |
| D704,127 S | 5/2014 | Depondt |
| D704,128 S | 5/2014 | Depondt |
| D704,129 S | 5/2014 | Depondt |
| D704,619 S | 5/2014 | Kim |
| D704,620 S | 5/2014 | Kim |
| 8,713,747 B2 | 5/2014 | Coughlin |
| 8,717,011 B2 | 5/2014 | Henning |
| 8,719,994 B2 | 5/2014 | Thienard et al. |
| 8,720,033 B2 | 5/2014 | Koppen et al. |
| 8,728,367 B2 | 5/2014 | Lay et al. |
| D706,200 S | 6/2014 | Tolentino et al. |
| D706,201 S | 6/2014 | Depondt |
| D706,202 S | 6/2014 | Depondt |
| 8,745,812 B2 | 6/2014 | Kruse et al. |
| 8,745,813 B2 | 6/2014 | Ishida et al. |
| 8,749,186 B2 | 6/2014 | Stubner et al. |
| 8,759,449 B2 | 6/2014 | Pieters et al. |
| D708,890 S | 7/2014 | Kim et al. |
| D709,362 S | 7/2014 | Kim |
| 8,769,762 B2 | 7/2014 | Op't Roodt et al. |
| 8,770,063 B2 | 7/2014 | Bhatti |
| 8,782,847 B2 | 7/2014 | Depondt |
| D711,217 S | 8/2014 | Jacobs et al. |
| 8,800,097 B2 | 8/2014 | Wegner et al. |
| 8,800,099 B2 | 8/2014 | Boland |
| 8,806,700 B2 | 8/2014 | Tolentino et al. |
| 8,813,608 B2 | 8/2014 | Hurst et al. |
| 8,823,228 B2 | 9/2014 | Mili et al. |
| 8,839,483 B2 | 9/2014 | Roodt et al. |
| D714,635 S | 10/2014 | Demar et al. |
| D715,142 S | 10/2014 | Allen et al. |
| 8,850,653 B2 | 10/2014 | Depondt |
| 8,854,455 B2 | 10/2014 | Haug |
| 8,857,595 B2 | 10/2014 | Mili et al. |
| 8,863,370 B2 | 10/2014 | Weiler et al. |
| 8,871,994 B2 | 10/2014 | Wei et al. |
| D717,225 S | 11/2014 | Kuo |
| 8,881,338 B2 | 11/2014 | Thielen et al. |
| 8,893,348 B2 | 11/2014 | Vankerkhove et al. |
| 8,909,421 B2 | 12/2014 | Zimmer |
| 8,913,132 B2 | 12/2014 | Seger et al. |
| 8,913,133 B2 | 12/2014 | Huelsen et al. |
| 8,917,323 B2 | 12/2014 | Seger et al. |
| 8,931,133 B2 | 1/2015 | Coart et al. |
| 8,935,056 B2 | 1/2015 | Zimmer |
| 8,938,847 B2 | 1/2015 | Avasiloaie et al. |
| 8,950,034 B2 | 2/2015 | Wilms |
| 8,950,035 B2 | 2/2015 | Benner et al. |
| 8,957,619 B2 | 2/2015 | Karcher |
| 8,963,464 B2 | 2/2015 | Braun et al. |
| D725,025 S | 3/2015 | Poton |
| 8,973,207 B2 | 3/2015 | Depondt |
| 8,973,209 B2 | 3/2015 | Depondt |
| 8,979,066 B2 | 3/2015 | Pfetzer et al. |
| 8,984,707 B2 | 3/2015 | Boland |
| 8,985,241 B2 | 3/2015 | Pozgay et al. |
| 8,997,304 B2 | 4/2015 | Oslizlo et al. |
| 9,000,594 B2 | 4/2015 | Guidez |
| 9,003,596 B2 | 4/2015 | Avasiloaie et al. |
| 9,008,905 B2 | 4/2015 | Prskawetz et al. |
| 9,015,896 B2 | 4/2015 | De Block |
| 9,018,877 B2 | 4/2015 | Braun et al. |
| 9,021,651 B2 | 5/2015 | Wolfgarten |
| 9,021,652 B2 | 5/2015 | Coemans et al. |
| 9,045,111 B2 | 6/2015 | Zimmer |
| 9,045,113 B2 | 6/2015 | Aznag et al. |
| 9,050,946 B2 | 6/2015 | Zimmer et al. |
| 9,056,595 B2 | 6/2015 | Wegner et al. |
| 9,071,089 B2 | 6/2015 | Kastinger et al. |
| 9,073,519 B2 | 7/2015 | Depondt |
| 9,079,567 B2 | 7/2015 | Wegner et al. |
| 9,096,196 B2 | 8/2015 | Criel et al. |
| 9,108,595 B2 | 8/2015 | Tolentino et al. |
| 9,114,754 B2 | 8/2015 | Ehlgen et al. |
| 9,114,783 B2 | 8/2015 | Depondt |
| 9,120,463 B2 | 9/2015 | Kim et al. |
| 9,120,464 B2 | 9/2015 | Pack et al. |
| 9,151,372 B2 | 10/2015 | Keller |
| 9,174,609 B2 | 11/2015 | Tolentino et al. |
| 9,174,611 B2 | 11/2015 | Tolentino et al. |
| 9,180,839 B2 | 11/2015 | Oslizio et al. |
| D744,331 S | 12/2015 | Vos et al. |
| 9,211,867 B2 | 12/2015 | Beelen et al. |
| 9,211,868 B2 | 12/2015 | Bousset et al. |
| 9,225,274 B2 | 12/2015 | Lingenfelser et al. |
| D746,700 S | 1/2016 | Boehnen et al. |
| 9,227,596 B2 | 1/2016 | Van De Rovaart et al. |
| 9,227,598 B2 | 1/2016 | Smets et al. |
| 9,233,664 B2 | 1/2016 | Weidlich |
| 9,254,820 B2 | 2/2016 | Geubel et al. |
| 9,260,085 B2 | 2/2016 | Bex et al. |
| 9,266,504 B2 | 2/2016 | De Block |
| 9,272,676 B2 | 3/2016 | Heger et al. |
| 9,505,380 B2 | 11/2016 | Tolentino et al. |
| D777,079 S | 1/2017 | Tolentino et al. |
| D784,804 S | 4/2017 | Peers et al. |
| D787,308 S | 5/2017 | Kawashima et al. |
| D787,312 S | 5/2017 | Peers et al. |
| D796,413 S | 9/2017 | Di Iulio |

(56) References Cited

U.S. PATENT DOCUMENTS

| | | |
|---|---|---|
| 9,783,165 B2 | 10/2017 | Houssat et al. |
| 9,925,957 B2 | 3/2018 | Shen |
| 9,969,360 B2 | 5/2018 | Benner et al. |
| 9,969,361 B2 | 5/2018 | Fink et al. |
| 2001/0013236 A1 | 8/2001 | Weyerstall et al. |
| 2002/0043092 A1 | 4/2002 | Jones et al. |
| 2002/0112306 A1 | 8/2002 | Komerska |
| 2002/0174505 A1 | 11/2002 | Kim |
| 2002/0192017 A1 | 12/2002 | Rosenstein et al. |
| 2003/0014828 A1 | 1/2003 | Edner-Walter et al. |
| 2003/0028990 A1 | 2/2003 | Zimmer |
| 2003/0033683 A1 | 2/2003 | Kotlarski |
| 2003/0074763 A1 | 4/2003 | Egner-Walter et al. |
| 2003/0159229 A1 | 8/2003 | Weiler et al. |
| 2003/0209049 A1 | 11/2003 | Jones et al. |
| 2003/0221276 A1 | 12/2003 | Siklosi |
| 2003/0229961 A1 | 12/2003 | Barnett |
| 2004/0010882 A1 | 1/2004 | Breesch |
| 2004/0025280 A1 | 2/2004 | Krickau et al. |
| 2004/0025281 A1 | 2/2004 | Baseotto et al. |
| 2004/0052577 A1 | 3/2004 | Lee et al. |
| 2004/0098821 A1 | 5/2004 | Kraemer et al. |
| 2004/0159994 A1 | 8/2004 | Lenzen et al. |
| 2004/0211021 A1 | 10/2004 | Weber et al. |
| 2004/0244137 A1 | 12/2004 | Poton |
| 2004/0250369 A1 | 12/2004 | Matsumoto et al. |
| 2005/0005387 A1 | 1/2005 | Kinoshita et al. |
| 2005/0011033 A1 | 1/2005 | Thomar et al. |
| 2005/0039292 A1 | 2/2005 | Boland |
| 2005/0166349 A1 | 8/2005 | Nakano et al. |
| 2005/0177970 A1 | 8/2005 | Scholl et al. |
| 2005/0252812 A1 | 11/2005 | Lewis |
| 2006/0010636 A1 | 1/2006 | Vacher |
| 2006/0026786 A1 | 2/2006 | Ku |
| 2006/0112511 A1 | 6/2006 | Op't Roodt et al. |
| 2006/0117515 A1 | 6/2006 | Fink et al. |
| 2006/0130263 A1 | 6/2006 | Coughlin |
| 2006/0156529 A1 | 7/2006 | Thomar et al. |
| 2006/0179597 A1 | 8/2006 | Hoshino et al. |
| 2006/0218740 A1 | 10/2006 | Coughlin |
| 2006/0230571 A1 | 10/2006 | Son |
| 2006/0248675 A1 | 11/2006 | Vacher et al. |
| 2006/0282972 A1 | 12/2006 | Huang |
| 2007/0017056 A1 | 1/2007 | Cooke et al. |
| 2007/0067939 A1 | 3/2007 | Huang |
| 2007/0067941 A1 | 3/2007 | Huang |
| 2007/0089257 A1 | 4/2007 | Harita et al. |
| 2007/0089527 A1 | 4/2007 | Shank et al. |
| 2007/0186366 A1 | 8/2007 | Alley |
| 2007/0220698 A1 | 9/2007 | Huang |
| 2007/0226940 A1 | 10/2007 | Thienard |
| 2007/0226941 A1 | 10/2007 | Kraemer et al. |
| 2007/0234501 A1 | 10/2007 | Ho et al. |
| 2007/0266517 A1 | 11/2007 | Kim et al. |
| 2008/0052865 A1 | 3/2008 | Chiang |
| 2008/0083082 A1 | 4/2008 | Rovaart et al. |
| 2008/0086830 A1 | 4/2008 | Kim |
| 2008/0092320 A1 | 4/2008 | Cempura et al. |
| 2008/0098554 A1 | 5/2008 | Cho |
| 2008/0098559 A1 | 5/2008 | Machida et al. |
| 2008/0115308 A1 | 5/2008 | Lee |
| 2008/0148509 A1 | 6/2008 | Bacarella et al. |
| 2008/0196192 A1 | 8/2008 | Yao |
| 2008/0222830 A1 | 9/2008 | Chiang |
| 2008/0222831 A1 | 9/2008 | Thienard |
| 2008/0222832 A1 | 9/2008 | Huang |
| 2008/0263805 A1 | 10/2008 | Sebring |
| 2008/0289133 A1 | 11/2008 | Kim |
| 2009/0007364 A1 | 1/2009 | Jarasson et al. |
| 2009/0013492 A1 | 1/2009 | Henin |
| 2009/0056049 A1 | 3/2009 | Jarasson et al. |
| 2009/0064440 A1 | 3/2009 | Boland |
| 2009/0126140 A1 | 5/2009 | Heinrich et al. |
| 2009/0151110 A1 | 6/2009 | Ku |
| 2009/0158545 A1 | 6/2009 | Grasso et al. |
| 2009/0158547 A1 | 6/2009 | Kim |
| 2009/0172910 A1 | 7/2009 | De Block et al. |
| 2009/0178226 A1 | 7/2009 | Lee et al. |
| 2009/0199357 A1 | 8/2009 | Thienard |
| 2010/0000041 A1 | 1/2010 | Boland |
| 2010/0005608 A1 | 1/2010 | Chien |
| 2010/0005609 A1 | 1/2010 | Kim |
| 2010/0024149 A1 | 2/2010 | Erdal |
| 2010/0024151 A1 | 2/2010 | Ku |
| 2010/0050360 A1 | 3/2010 | Chiang |
| 2010/0050361 A1 | 3/2010 | Chang et al. |
| 2010/0064468 A1 | 3/2010 | Kang |
| 2010/0083454 A1 | 4/2010 | Op't Roodt et al. |
| 2010/0186185 A1 | 7/2010 | Grasso et al. |
| 2010/0205763 A1 | 8/2010 | Ku |
| 2010/0212101 A1 | 8/2010 | Thienard et al. |
| 2010/0236008 A1 | 9/2010 | Yang et al. |
| 2010/0236675 A1 | 9/2010 | Schneider |
| 2010/0242204 A1 | 9/2010 | Chien |
| 2010/0251502 A1 | 10/2010 | Summerville et al. |
| 2010/0281645 A1 | 11/2010 | Kim et al. |
| 2011/0005020 A1 | 1/2011 | Koppen et al. |
| 2011/0041280 A1 | 2/2011 | Choi et al. |
| 2011/0047742 A1 | 3/2011 | Kim et al. |
| 2011/0072607 A1 | 3/2011 | Van Baelen et al. |
| 2011/0107542 A1 | 5/2011 | Op't Roodt |
| 2011/0113582 A1 | 5/2011 | Kruse et al. |
| 2011/0113583 A1 | 5/2011 | Shanmugham et al. |
| 2011/0162161 A1 | 7/2011 | Amado |
| 2011/0192511 A1 | 8/2011 | Marrone |
| 2011/0219563 A1 | 9/2011 | Guastella et al. |
| 2011/0277264 A1 | 11/2011 | Ehde |
| 2011/0277266 A1 | 11/2011 | Umeno |
| 2012/0027206 A1 | 2/2012 | Suzuki et al. |
| 2012/0030894 A1 | 2/2012 | Garrastacho et al. |
| 2012/0047673 A1 | 3/2012 | Depondt |
| 2012/0054976 A1 | 3/2012 | Yang et al. |
| 2012/0060316 A1 | 3/2012 | Avasiloaie et al. |
| 2012/0090123 A1 | 4/2012 | Caillot et al. |
| 2012/0102669 A1 | 5/2012 | Lee et al. |
| 2012/0144615 A1 | 6/2012 | Song et al. |
| 2012/0159733 A1 | 6/2012 | Kwon |
| 2012/0180245 A1 | 7/2012 | Ku |
| 2012/0180246 A1 | 7/2012 | Ku |
| 2012/0186035 A1 | 7/2012 | Lee |
| 2012/0266405 A1 | 10/2012 | Tolentinto et al. |
| 2012/0279008 A1 | 11/2012 | Depondt |
| 2012/0311808 A1 | 12/2012 | Yang et al. |
| 2012/0317740 A1 | 12/2012 | Yang et al. |
| 2013/0025084 A1 | 1/2013 | Tolentino et al. |
| 2013/0067674 A1 | 3/2013 | Chiang |
| 2013/0067675 A1 | 3/2013 | Chien |
| 2013/0067678 A1 | 3/2013 | Ehde |
| 2013/0104334 A1 | 5/2013 | Depondt |
| 2013/0117957 A1 | 5/2013 | Ku |
| 2013/0125333 A1 | 5/2013 | Tolentino et al. |
| 2013/0152323 A1 | 6/2013 | Chien |
| 2013/0152326 A1 | 6/2013 | Oslizlo et al. |
| 2013/0152330 A1 | 6/2013 | Kim et al. |
| 2013/0167316 A1 | 7/2013 | Egner-Walter et al. |
| 2013/0185889 A1 | 7/2013 | Tolentino et al. |
| 2013/0185890 A1 | 7/2013 | Ku |
| 2013/0192015 A1 | 8/2013 | Tolentino et al. |
| 2013/0192016 A1 | 8/2013 | Kim et al. |
| 2013/0193992 A1 | 8/2013 | Tolentino et al. |
| 2013/0205532 A1 | 8/2013 | Tolentino et al. |
| 2013/0212828 A1 | 8/2013 | Coughlin |
| 2013/0219649 A1 | 8/2013 | Tolentinto et al. |
| 2013/0227809 A1 | 9/2013 | Tolentinto et al. |
| 2013/0227810 A1 | 9/2013 | Tolentinto et al. |
| 2013/0239353 A1* | 9/2013 | Yoshimoto ............ B60S 1/3863 15/250.32 |
| 2013/0247323 A1 | 9/2013 | Geubel et al. |
| 2013/0255026 A1 | 10/2013 | Depondt |
| 2013/0263400 A1 | 10/2013 | Duesterhoeft et al. |
| 2013/0291329 A1 | 11/2013 | Izabel |
| 2013/0298348 A1 | 11/2013 | Caillot et al. |
| 2013/0305475 A1 | 11/2013 | Kim et al. |
| 2013/0305478 A1 | 11/2013 | Kim et al. |

(56) References Cited

U.S. PATENT DOCUMENTS

| | | |
|---|---|---|
| 2013/0333145 A1 | 12/2013 | Depondt |
| 2013/0333146 A1 | 12/2013 | Depondt |
| 2014/0026348 A1 | 1/2014 | Schaeuble |
| 2014/0026349 A1 | 1/2014 | Schaeuble |
| 2014/0026350 A1 | 1/2014 | Boland |
| 2014/0068886 A1 | 3/2014 | Ku |
| 2014/0082875 A1 | 3/2014 | Peers et al. |
| 2014/0115611 A1 | 5/2014 | Kim et al. |
| 2014/0130283 A1 | 5/2014 | Boland et al. |
| 2014/0130287 A1 | 5/2014 | Bex et al. |
| 2014/0150198 A1 | 6/2014 | Kim et al. |
| 2014/0182075 A1 | 7/2014 | Polocoser et al. |
| 2014/0196241 A1 | 7/2014 | Kim et al. |
| 2014/0259504 A1 | 9/2014 | Piotrowski et al. |
| 2014/0259505 A1 | 9/2014 | Fournier et al. |
| 2014/0283325 A1 | 9/2014 | Kawashima et al. |
| 2014/0317875 A1 | 10/2014 | Tolentino et al. |
| 2014/0338144 A1 | 11/2014 | An et al. |
| 2014/0359963 A1 | 12/2014 | An et al. |
| 2014/0373301 A1 | 12/2014 | Kim et al. |
| 2015/0026908 A1 | 1/2015 | Izabel et al. |
| 2015/0047141 A1 | 2/2015 | Houssat et al. |
| 2015/0059116 A1 | 3/2015 | An et al. |
| 2015/0074935 A1 | 3/2015 | An et al. |
| 2015/0089764 A1 | 4/2015 | Wu |
| 2015/0135468 A1 | 5/2015 | Kim |
| 2015/0151718 A1* | 6/2015 | Moll .................... B60S 1/4048 15/250.32 |
| 2015/0158463 A1 | 6/2015 | Yi |
| 2015/0166016 A1 | 6/2015 | Wang |
| 2015/0246659 A1 | 9/2015 | Park |
| 2015/0251636 A1 | 9/2015 | Kim et al. |
| 2015/0251637 A1 | 9/2015 | Tolentino et al. |
| 2015/0258965 A1 | 9/2015 | An |
| 2015/0274130 A1 | 10/2015 | Tolentinto et al. |
| 2015/0274131 A1 | 10/2015 | Tolentinto et al. |
| 2015/0353054 A1 | 12/2015 | Tolentino et al. |
| 2016/0046263 A1 | 2/2016 | Tolentino et al. |
| 2016/0059828 A1 | 3/2016 | Tolentino et al. |
| 2016/0101763 A1* | 4/2016 | Schaeuble ............. B60S 1/4077 15/250.04 |
| 2016/0159323 A1 | 6/2016 | Tolentinto et al. |
| 2016/0280186 A1 | 9/2016 | Peers et al. |
| 2016/0375867 A1 | 12/2016 | Tolentino et al. |
| 2017/0057464 A1 | 3/2017 | Tolentino et al. |
| 2017/0072912 A1 | 3/2017 | Tolentino et al. |
| 2017/0113656 A1 | 4/2017 | Tolentino |
| 2017/0334400 A1 | 11/2017 | Kawashima |
| 2017/0334404 A1 | 11/2017 | Kawashima |
| 2017/0334406 A1 | 11/2017 | Kawashima |
| 2017/0334769 A1 | 11/2017 | Luzzato et al. |
| 2018/0079390 A1 | 3/2018 | Tolentino et al. |
| 2018/0086312 A1 | 3/2018 | Houssat et al. |
| 2018/0086313 A1 | 3/2018 | Houssat et al. |
| 2018/0086314 A1 | 3/2018 | Houssat et al. |
| 2018/0105144 A1 | 4/2018 | Yee et al. |
| 2018/0126956 A1 | 5/2018 | Lee et al. |
| 2018/0126957 A1 | 5/2018 | Lee et al. |

FOREIGN PATENT DOCUMENTS

| | | |
|---|---|---|
| AU | 2008100641 A1 | 8/2008 |
| AU | 2009238193 A1 | 10/2009 |
| BR | PI0411532 A | 8/2006 |
| BR | 0007263 B1 | 1/2009 |
| BR | PI0519259 A2 | 1/2009 |
| BR | 0006917 B1 | 8/2009 |
| CA | 2553977 A1 | 9/2005 |
| CA | 2554048 A1 | 9/2005 |
| CA | 2514372 A1 | 1/2006 |
| CA | 2574330 A1 | 2/2006 |
| CA | 2523315 A1 | 4/2006 |
| CA | 2522729 A1 | 6/2006 |
| CA | 2598104 A1 | 9/2006 |
| CA | 2541641 A1 | 10/2006 |
| CA | 2550409 A1 | 11/2006 |
| CA | 2568561 A1 | 5/2007 |
| CA | 2569175 A1 | 5/2007 |
| CA | 2569176 A1 | 5/2007 |
| CA | 2569977 A1 | 6/2007 |
| CA | 2631513 A1 | 6/2007 |
| CA | 2560155 A1 | 9/2007 |
| CA | 2645821 A1 | 10/2007 |
| CA | 2649474 A1 | 11/2007 |
| CA | 2649760 A1 | 11/2007 |
| CA | 2651069 A1 | 11/2007 |
| CA | 2590443 A1 | 4/2008 |
| CA | 2574242 A1 | 7/2008 |
| CA | 2617013 A1 | 11/2008 |
| CA | 2628517 A1 | 4/2009 |
| CA | 2671767 A1 | 1/2010 |
| CA | 2789431 C | 8/2011 |
| CA | 2802812 A1 | 1/2012 |
| CA | 2865295 C | 8/2013 |
| CN | 1982128 A | 6/2007 |
| CN | 100586767 A | 12/2007 |
| CN | 101087709 A | 12/2007 |
| CN | 101863265 B | 10/2010 |
| CN | 102001327 A | 4/2011 |
| CN | 102164786 A | 8/2011 |
| CN | 201998951 U | 10/2011 |
| CN | 202193060 U | 4/2012 |
| CN | 102653269 A | 9/2012 |
| CN | 102834305 A | 12/2012 |
| CN | 102917923 A | 2/2013 |
| CN | 102958764 A | 3/2013 |
| CN | 202863398 U | 4/2013 |
| CN | 104114418 A | 10/2014 |
| CN | 104114420 A | 10/2014 |
| CN | 104125899 A | 10/2014 |
| CN | 104144828 A | 11/2014 |
| CN | 104149745 A | 11/2014 |
| CN | 104149746 A | 11/2014 |
| CN | 104149747 A | 11/2014 |
| CN | 104228770 A | 12/2014 |
| CN | 104512379 A | 4/2015 |
| CN | 105283358 A | 1/2016 |
| CN | 105431336 A | 3/2016 |
| CN | 105620425 A | 6/2016 |
| CN | 106274819 A | 1/2017 |
| CN | 106394509 A | 2/2017 |
| DE | 102004019157 A1 | 11/2005 |
| DE | 102004061088 A1 | 6/2006 |
| DE | 102005019389 A1 | 11/2006 |
| DE | 102005062462 A1 | 6/2007 |
| DE | 102006057024 A1 | 6/2008 |
| DE | 102007030169 A1 | 1/2009 |
| DE | 102007051549 A1 | 4/2009 |
| DE | 102008042516 A1 | 5/2009 |
| DE | 102008001045 A1 | 10/2009 |
| DE | 102008001457 A1 | 11/2009 |
| DE | 102008002447 A1 | 12/2009 |
| EP | 0895907 * | 2/1999 |
| EP | 1937524 A1 | 7/2003 |
| EP | 1547883 A1 | 6/2005 |
| EP | 1612113 A2 | 1/2006 |
| EP | 1666319 A2 | 6/2006 |
| EP | 1708911 A1 | 10/2006 |
| EP | 1719673 A1 | 11/2006 |
| EP | 1733939 A1 | 12/2006 |
| EP | 1740424 A1 | 1/2007 |
| EP | 1744940 A1 | 1/2007 |
| EP | 1753646 A1 | 2/2007 |
| EP | 1758772 A1 | 3/2007 |
| EP | 1769987 A1 | 4/2007 |
| EP | 1792794 A1 | 6/2007 |
| EP | 1799518 A1 | 6/2007 |
| EP | 1800977 A2 | 6/2007 |
| EP | 1800978 A2 | 6/2007 |
| EP | 1833708 A1 | 9/2007 |
| EP | 1846274 A1 | 10/2007 |
| EP | 1849666 A1 | 10/2007 |
| EP | 2015971 A1 | 1/2009 |

(56) References Cited

FOREIGN PATENT DOCUMENTS

| | | | |
|---|---|---|---|
| EP | 2050638 A2 | 4/2009 | |
| EP | 2079617 A1 | 7/2009 | |
| EP | 2109557 A1 | 10/2009 | |
| EP | 2113432 A1 | 11/2009 | |
| EP | 2134576 A1 | 12/2009 | |
| EP | 2138363 A1 | 12/2009 | |
| EP | 2143603 A2 | 1/2010 | |
| EP | 2146877 A1 | 1/2010 | |
| EP | 2781416 | * | 10/2015 |
| EP | 2683581 B1 | 8/2016 | |
| EP | 2808207 B1 | 9/2016 | |
| EP | 3072757 B1 | 9/2016 | |
| EP | 2683581 B1 | 10/2016 | |
| EP | 3142904 B1 | 3/2017 | |
| EP | 3178710 A1 | 6/2017 | |
| EP | 2660109 B1 | 9/2017 | |
| EP | 3083344 B1 | 4/2018 | |
| EP | 3164304 B1 | 6/2018 | |
| EP | 2996911 B1 | 8/2018 | |
| EP | 3165416 B1 | 8/2018 | |
| FR | 2879987 A1 | 6/2006 | |
| HK | 1110560 A1 | 5/2010 | |
| IN | 5021 B | 1/2007 | |
| JP | 6-156200 | * | 6/1994 |
| JP | 2005524567 A | 8/2005 | |
| JP | 2008037388 A | 2/2008 | |
| JP | 2010018273 U | 1/2010 | |
| KR | 10-0891195 B1 | 4/2009 | |
| MX | PA05008266 A | 9/2005 | |
| MX | PA05005581 A | 11/2005 | |
| MX | PA06008594 A | 8/2006 | |
| MX | 2007007828 A | 7/2007 | |
| MX | 2007007829 A | 7/2007 | |
| MX | 2008012325 A | 10/2008 | |
| MX | 2008013480 A | 10/2008 | |
| MX | 2008013814 A | 12/2008 | |
| MX | 2008014163 A | 2/2009 | |
| MX | 2009013050 A | 1/2010 | |
| MX | 2009013051 A | 1/2010 | |
| MY | 122308 A | 4/2006 | |
| MY | 128028 A | 1/2007 | |
| MY | 128970 A | 3/2007 | |
| RU | 2260527 C2 | 9/2005 | |
| RU | 2260528 C2 | 9/2005 | |
| RU | 2268176 C1 | 1/2006 | |
| RU | 2271287 C2 | 3/2006 | |
| RU | 2293034 C2 | 2/2007 | |
| RU | 2294291 C1 | 2/2007 | |
| RU | 2007127898 A | 1/2009 | |
| RU | 80415 U1 | 2/2009 | |
| RU | 2346834 C1 | 2/2009 | |
| RU | 2369500 C1 | 10/2009 | |
| RU | 2381120 C2 | 2/2010 | |
| WO | 2005/039944 | * | 5/2005 |
| WO | 2006/074995 A1 | 7/2005 | |
| WO | 2005/080160 A1 | 9/2005 | |
| WO | 2005/082691 A1 | 9/2005 | |
| WO | 2005/087560 A1 | 9/2005 | |
| WO | 2005/092680 A1 | 10/2005 | |
| WO | 2005/102801 A1 | 11/2005 | |
| WO | 2005/115813 A1 | 12/2005 | |
| WO | 2005/123471 A1 | 12/2005 | |
| WO | 2006/000393 A1 | 1/2006 | |
| WO | 2006/013152 A1 | 2/2006 | |
| WO | 2006/040259 A1 | 4/2006 | |
| WO | 2006/048355 A1 | 5/2006 | |
| WO | 2006/061284 A1 | 6/2006 | |
| WO | 2006/069648 A1 | 7/2006 | |
| WO | 2006/079591 A1 | 8/2006 | |
| WO | 2006/081893 A1 | 8/2006 | |
| WO | 2006/106006 A1 | 10/2006 | |
| WO | 2006/106109 A1 | 10/2006 | |
| WO | 2006/114355 A1 | 11/2006 | |
| WO | 2006/117081 A1 | 11/2006 | |
| WO | 2006/117085 A1 | 11/2006 | |
| WO | 2006/117308 A1 | 11/2006 | |
| WO | 2006119679 A1 | 11/2006 | |
| WO | 2007/009885 A1 | 1/2007 | |
| WO | 2007/014389 A2 | 2/2007 | |
| WO | 2007/014395 A2 | 2/2007 | |
| WO | 2007/035288 A1 | 3/2007 | |
| WO | 2007/042377 A1 | 4/2007 | |
| WO | 2007/045549 A1 | 4/2007 | |
| WO | 2007/071487 A1 | 6/2007 | |
| WO | 2007/073974 A1 | 7/2007 | |
| WO | 2007/102404 A1 | 9/2007 | |
| WO | 2007/122095 A1 | 11/2007 | |
| WO | 2007/128677 A1 | 11/2007 | |
| WO | 2008/003633 A1 | 1/2008 | |
| WO | 2008/043622 A1 | 4/2008 | |
| WO | 2008/051483 A2 | 5/2008 | |
| WO | 2008/076402 A1 | 6/2008 | |
| WO | 2008/122453 A1 | 10/2008 | |
| WO | 2008/124113 A1 | 10/2008 | |
| WO | 2008/135308 A1 | 11/2008 | |
| WO | 2009/000498 A1 | 12/2008 | |
| WO | 2009/115494 A1 | 9/2009 | |
| WO | 2009/121849 A1 | 10/2009 | |
| WO | 2009/124732 A1 | 10/2009 | |
| WO | 2009/132982 A1 | 11/2009 | |
| WO | 2009/153097 A1 | 12/2009 | |
| WO | 2009/155230 A1 | 12/2009 | |
| WO | 2010/016000 A1 | 2/2010 | |
| WO | 2010/028866 A1 | 3/2010 | |
| WO | 2010/028918 A1 | 3/2010 | |
| WO | 2014/040050 A1 | 3/2014 | |
| WO | 2014040050 A1 | 3/2014 | |
| WO | 2017/063687 A1 | 4/2017 | |
| WO | 2017063687 A1 | 4/2017 | |
| WO | 2017/201458 A1 | 11/2017 | |
| WO | 2017/201464 A1 | 11/2017 | |
| WO | 2017/201485 A1 | 11/2017 | |
| WO | 2017190762 A1 | 11/2017 | |
| WO | 2017201458 A1 | 11/2017 | |
| WO | 2017201464 A1 | 11/2017 | |
| WO | 2017201485 A1 | 11/2017 | |

* cited by examiner

WINDSHIELD WIPER CONNECTOR

CROSS REFERENCE TO RELATED APPLICATIONS

This application is a continuation-in-part of U.S. application Ser. No. 15/600,254, filed May 19, 2017, which claims the benefit of U.S. Provisional Application No. 62/338,834 filed May 19, 2016, the disclosures of which are hereby incorporated herein by reference in their entirety.

TECHNICAL FIELD

This invention relates in general to windshield wipers, and more particularly, to an improved connector for a windshield wiper that allows the windshield wiper to be attached to windshield wiper arm configurations with a slotted receiving portion. The invention is also directed to windshield wipers incorporating these novel connectors.

BACKGROUND

There are a variety of wiper arms on which wiper blades are provided as original equipment. These various wiper arms have hooks, pins, or other configurations which may connect to the wiper blade with or without connectors. These various configurations have created a problem in the replacement market because wiper blade providers are required to have multiple wiper blade configurations to accommodate all of the existing wiper arms. It is therefore advantageous to have attachment structures that can accommodate a host of arms to reduce the complexity and cost associated with this problem.

The need to attach replacement windshield wiper blades to multiple arms has been addressed to some degree. For example, windshield wiper blades have been designed to work with various hook-type wiper arms having different sizes. Connectors may also be configured to receive either a pin-type arm or a hook arm. While these connectors may increase the usefulness of a given windshield wiper such that it can be used with different wiper arm types, the connectors are often expensive and have a complicated structure that is difficult and time-consuming to manufacture Thus, there is a need for inexpensive connectors that are capable of securing a windshield wiper blade to a variety of arms. It would also be desirable to have a windshield wiper connector that can be fabricated or molded as a single piece at low-cost, and that can accommodate a variety of wiper arms. The disclosed concepts provide a low-cost windshield wiper connector capable of attachment to a variety of windshield wiper arms for the purpose of reducing the amounts of inventory parts required to supply a vehicle market that uses a wide variety of windshield wiper arm types.

SUMMARY OF DISCLOSURE

The following presents a simplified summary of the disclosure in order to provide a basic understanding of some aspects of the disclosed embodiments. This summary is not an extensive overview. It is intended to neither identify key or critical elements of the disclosed embodiments nor delineate the scope of the invention. Its sole purpose is to present some concepts of the disclosed embodiments in a simplified form as a prelude to the more detailed description that is presented later.

This disclosure is generally directed to novel connectors for windshield wiper blades. More particularly, the disclosure relates, in part, to a single piece windshield wiper connector that can accommodate multiple windshield wiper arms having varying slotted locking mechanisms.

In certain embodiments the connector for connecting a windshield wiper assembly to a wiper arm may have a peripheral wall having at least two opposing peripheral side walls and a top surface extending from one of the two opposing peripheral side walls to the other. The opposing peripheral side walls may each have a guide pin sized to be capable of slideably engaging slots on the slotted receiving portions of a windshield wiper arm. In some embodiments, the connector may further have a locking tab in the top surface sized such that it is capable of engaging a locking aperture on the top surface of the slotted receiving portion of the windshield wiper arm.

In certain embodiments a wiper blade assembly may include a wiper strip, a force distribution structure and a connector have a peripheral wall having at least two opposing peripheral side walls and a top surface extending from one of the two opposing peripheral side walls to the other. The opposing peripheral side walls may each have a guide pin sized to be capable of slideably engaging slots on the slotted receiving portions of a windshield wiper arm. In some embodiments, the connector may further have a locking tab in the top surface sized such that it is capable of engaging a locking aperture on the top surface of the slotted receiving portion of the windshield wiper arm.

DETAILED DESCRIPTION OF THE DISCLOSURE

Figure 1:
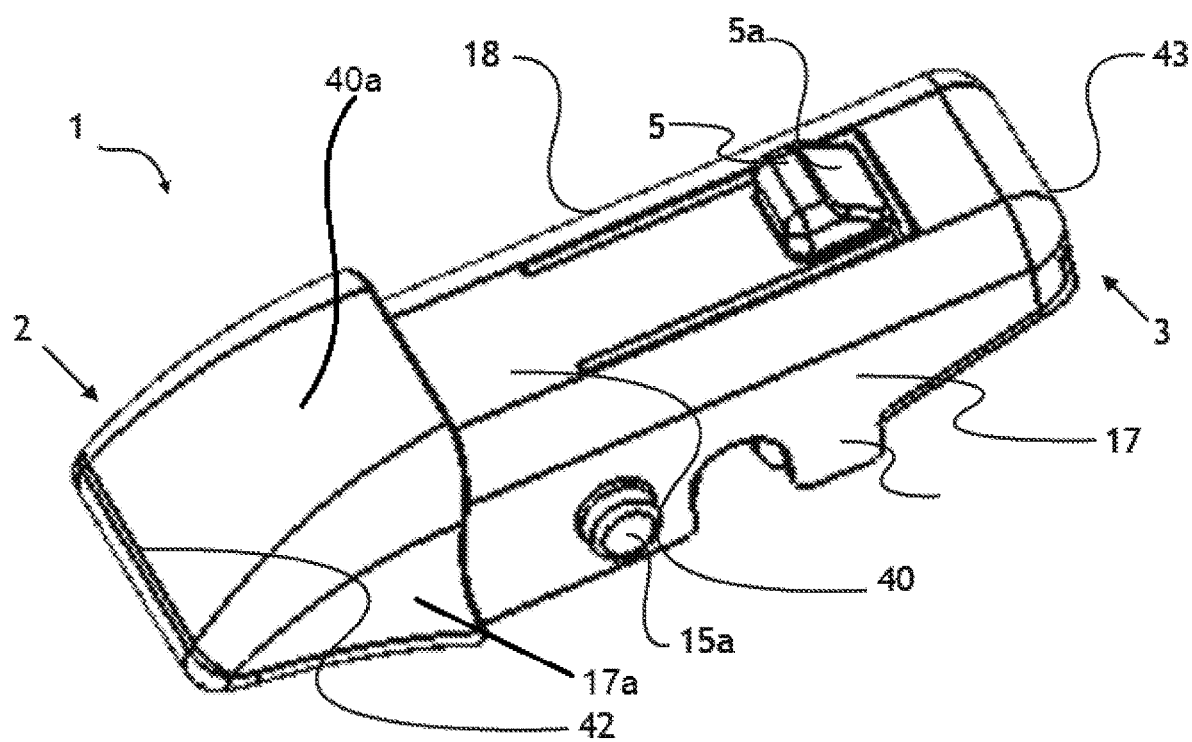
FIG. 1 is a top perspective view of an embodiment of a connector of the disclosure.

The following detailed description and the appended drawings describe and illustrate exemplary embodiments solely for the purpose of enabling one of ordinary skill in the relevant art to make and use the disclosed embodiments. As such, the detailed description and illustration of these embodiments are purely exemplary in nature and are in no way intended to limit the scope of the invention, or its protection, in any manner. It should also be understood that the drawings are not to scale and in certain instances details have been omitted, which are not necessary for an understanding of the present invention, such as conventional details of fabrication and assembly.

In one aspect, the invention is generally directed to a connector 1 for a windshield wiper (or a windshield wiper incorporating same) that allows a windshield wiper to be secured to a windshield wiper arm. In this aspect, the connector 1 may be designed for use with windshield wiper arms that use slotted receiving portions that secure the windshield wiper to the windshield wiper arm.

In certain embodiments the connector for connecting a windshield wiper assembly to a wiper arm may have a peripheral wall having at least two opposing peripheral side walls and a top surface extending from one of the two opposing peripheral side walls to the other. The opposing peripheral side walls may each have a guide pin sized to be capable of slideably engaging slots on the slotted receiving portions of a windshield wiper arm.

In some embodiments, the opposing side walls and/or the top surface of the connector may be raised along a portion of the front end. The raised side walls and/or top surface may provide a structure for the windshield wiper arm receiving portion to abut when engaged with the connector. Further, the raised side walls and/or top surface of the connector may provide a streamlined transition surface where the receiving portion of the wiper arm and front end of the connector meet. In further embodiments, the connector slopes downward from the proximity of the abutment with the receiving portion of the wiper arm towards the front end, further providing a streamlined look at the connector-wiper arm junction.

In some embodiments, the connector may further have a locking tab in the top surface sized such that it is capable of engaging a locking aperture on the top surface of the slotted receiving portion of the windshield wiper arm. In some embodiments, the locking tab may be cantilevered. In some embodiments, a top portion of the locking tab may have a protruding lip that extends outward from the locking tab, to further secure the locking tab in the locking aperture. The guide pins on the opposing peripheral side walls may provide a structure for assisting in maintaining proper positioning of the connector while slideably engaging the wiper arm. The guide pins may also provide proper positioning of the connector as it is slideably placed into the receiving portion of the windshield wiper arm, upon which the locking tab engages the locking aperture to finally maintain the position of the connector on the wiper arm.

In some embodiments, the connector may have at least two longitudinal internal support walls extending downward from the top surface, and substantially along the longitudinal length of the connector, and at least one rivet passage and arcuate rivet clip in each of the internal longitudinal support walls for accepting and securing a rivet of a wiper blade, thereby securing the connector to the wiper blade. In some of these embodiments, the connector may have a clasp along the rivet passage for further securing the connector to the wiper blade. In some of these embodiments, the connector may be capable of being secured to the mounting base of a windshield wiper blade assembly via the rivet through the mounting base. In some embodiments, the at least one rivet passage extends through one or both of the peripheral side walls. In additional embodiments, the connector may have at least one transverse internal support wall connecting the two longitudinal internal support walls and providing additional support and rigidity to the connector.

In some embodiments the connector may be fabricated as a single piece. In other embodiments the front portion of the connector may be fabricated as one piece, and the back portion of the connector may be fabricated as one piece.

In certain embodiments a wiper blade assembly may include a wiper strip, a force distribution structure and a connector have a peripheral wall having at least two opposing peripheral side walls and a top surface extending from one of the two opposing peripheral side walls to the other. The opposing peripheral side walls may each have a guide pin sized to be capable of slideably engaging slots on the slotted receiving portions of a windshield wiper arm. In some embodiments, the connector may further have a locking tab in the top surface sized such that it is capable of engaging a locking aperture on the top surface of the slotted receiving portion of the windshield wiper arm.

In certain embodiments the opposing side walls and/or the top surface of the connector may be raised along a portion of the front end, wherein the raised side walls and/or top surface may provide an abutment structure capable of abutting the windshield wiper arm receiving portion when the arm is engaged with the connector. In certain embodiments the raised side walls and/or top surface of the connector may provide a streamlined transition surface where the receiving portion of the wiper arm and front end of the connector meet. In certain embodiments the connector may slope downward from the proximity of the abutment structure towards the front end, further providing a streamlined look at the connector-wiper arm junction.

In certain embodiments, a locking tab in the top surface of the connector may be sized such that it is capable of engaging a locking aperture on the top surface of the slotted receiving portion of the windshield wiper arm. In certain embodiments the locking tab may be cantilevered. In some embodiments, a top portion of the locking tab may have a protruding lip that extends outward from the locking tab, to further secure the locking tab in the locking aperture.

In certain embodiments the guide pins on the opposing peripheral side walls of the connector may be capable of assisting in maintaining proper positioning of the connector while slideably engaging the wiper arm and providing proper positioning of the connector as it is slideably placed into the receiving portion of the windshield wiper arm, upon which the locking tab engages the locking aperture to finally maintain the position of the connector on the wiper arm. In certain embodiments, the connector of the wiper blade assembly may further include at least two longitudinal internal support walls extending downward from the top surface, and substantially along the longitudinal length of the connector.

In certain embodiments the connector of the wiper blade assembly may further include at least one rivet passage and arcuate rivet clip in each of the internal longitudinal support walls for accepting and securing a rivet of a wiper blade, thereby securing the connector to the wiper blade. In some of these embodiments, the connector may have a clasp along the rivet passage for securing the connector to the wiper blade. The clasp may provide a more secure (semi-permanent) locking mechanism for securing a rivet. In certain embodiments the connector may be fabricated as a single piece.

In certain embodiments, the connector may have a shelf along the rivet passage for further securing the connector to the wiper blade.

In some aspects, a wiper blade assembly of the disclosure may have a wiper blade having a rivet and a connector having a peripheral wall having two opposing side walls, a top surface having a flat back shelf and a sloped front shelf, a locking tab on the surface of the flat back shelf capable of engaging the locking aperture of a receiving portion of a wiper arm, at least two internal support walls, each of the two internal support walls having a rivet passage and an arcuate rivet clip for receiving the rivet of the wiper blade, and a guide pin on the surface of each of the two opposing side walls.

FIG. 1 illustrates a top perspective view of an embodiment of a connector 1 of the disclosure. The connector 1 has a front end 2 and a back end 3. For purposes of this disclosure, the back end 3 of the connector receives the wiper arm, and the front end 2 of the connector is opposite the back end 3. A peripheral wall 4 may extend around the periphery of the connector 1. The peripheral wall 4 may include a front portion 42, a back portion 43, and opposing side portions that connect the front and back portions, referred to as a first side 17 and a second side 18. A top surface 40 extends between opposing peripheral side walls 17, 18.

The opposing peripheral side walls 17, 18 may each have a guide pin 15a, 15b, the pins are sized to be capable of slideably engaging slots on slotted receiving portions of a windshield wiper arm. In some embodiments, the front portions of the opposing side walls 17a, 18b and/or the front portions of the top surface 40a of the connector may be raised relative to the respective back portions of the opposing side walls 17, 18, and top surface 40. In some embodiments the front portions of the opposing side walls 17a, 18a, may define a width which is greater than the width of the opposing side walls 17, 18 at the back end of the connector 1. Similalry, in some embodiments the front portions of the opposing side walls 17a, 18a, may define a width which is greater than the width of the opposing side walls 17, 18 at the guide pins 15a, 15b. The raised and/or wider side walls 17a, 18a and/or top surface 40a may provide a structure for the windshield wiper arm receiving portion to abut when engaged with the connector 1. Further, the raised and/or wider side walls and/or top surface 40a of the connector may provide a streamlined transition surface where the receiving portion of the wiper arm and front end of the connector 1 meet. In further embodiments, the connector 1 slopes downward from the proximity of the abutment with the receiving portion of the wiper arm towards the front end 2, further providing a streamlined look at the connector-wiper arm junction.

The top surface 40 of the connector 1 may also have a locking tab 5 in the top surface 40 sized such that it is capable of engaging a locking aperture LA (see FIG. 10) on the top surface of the slotted receiving portion SRP of a windshield wiper arm. In some embodiments, the locking tab 5 is cantilevered. As shown in FIG. 1, the locking tab may be structured with an angled face 5a such that the top surface of the slotted receiving portion SRP of a windshield wiper arm more readily slides over the locking tab and pushes it downward as the slotted receiving portion SRP receives the connector. Once the connector 1 is pushed completely into the slotted receiving portion SRP, the locking tab 5 protrudes into the locking aperture LA of the receiving portion (see FIG. 11) to "lock" the connector 1 into place.

The guide pins 15a, 15b on the opposing peripheral side walls 4 may provide a structure for assisting in maintaining proper positioning of the connector 1 while slidably engaging the wiper arm's slotted receiving portion SRP. The guide pins 15a, 15b also provide proper positioning of the connector 1 as it is slidably placed into the receiving portion of the windshield wiper arm, upon which the locking tab engages the locking aperture to finally maintain the position of the connector on the wiper arm.

Figure 2:
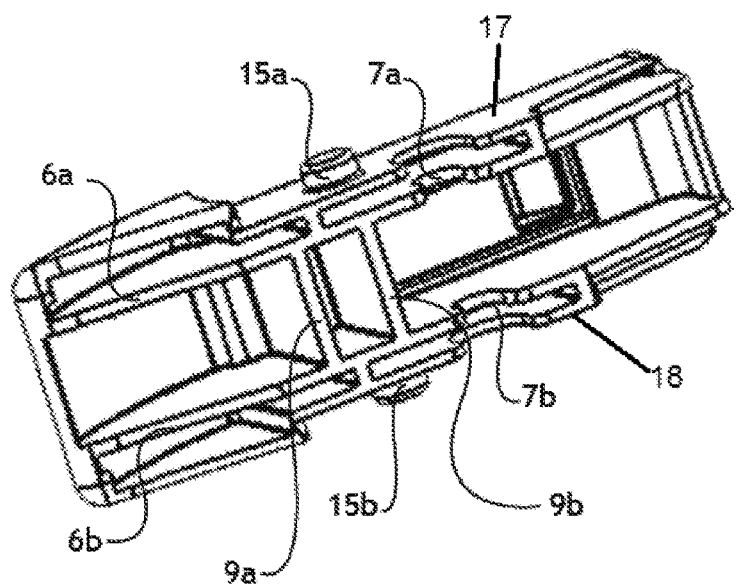
FIG. 2 is a bottom perspective view of the connector shown in FIG. 1.
Figure 9:
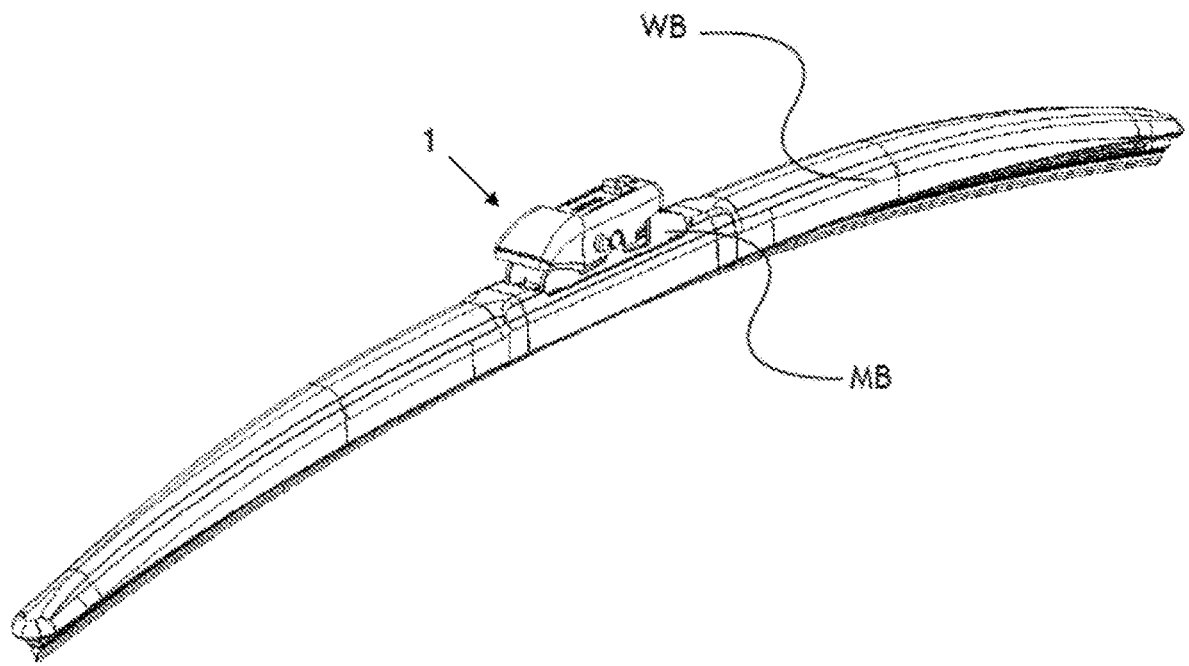
FIG. 9 is a top perspective view of the connector shown in FIG. 1 attached to a windshield wiper blade.

FIG. 2 illustrates a bottom perspective view of an embodiment of the connector 1 that shows the internal support structure having at least two longitudinal internal support walls 6a, 6b extending downward from the top surface, and substantially along the longitudinal length of the connector 1. The connector 1 may also have at least one rivet passage 7a, 7b and arcuate rivet clip 8a, 8b (see FIGS. 5 and 6) in each of the internal longitudinal support walls 6a, 6b for accepting and securing a rivet of a wiper blade to secure the connector to the wiper blade. The support walls can extend substantially along the length of the connector continuously, or intermittently, having gaps along the way. In particular, internal support walls 6a, 6b provide rigidity and structural strength to the connector 1. In some of these embodiments, the connector may be capable of being secured to the mounting base of a windshield wiper blade assembly via the rivet through the mounting base, as shown in FIG. 9. In some embodiments, the at least one rivet passage 7a, 7b may extend through one or both of the peripheral side walls, as illustrated in FIG. 2. In additional embodiments, the connector 1 may have at least one transverse internal support wall 9 (two walls 9a, 9b are shown in FIG. 2) connecting the two longitudinal internal support walls 6a, 6b and providing additional support and rigidity to the connector.

Those skilled in the art will recognize that connector 1 can be fabricated from any suitable material known in the art, including without limitation, rigid or elastic plastics, metals, synthetic and natural rubber compounds, etc. However, certain embodiments contemplate materials that can be molded such that connector 1 is fabricated as a single piece. In other embodiments the connecter can be fabricated in multiple pieces. For instance the wider front portion of the connector 1 may be fabricated as a separate cap which engages and is secured to the back portion of the connector through projections and recesses, detents that engage shoulders, or through any other known method of securing a cap to a connector known in the art.

Figure 3:
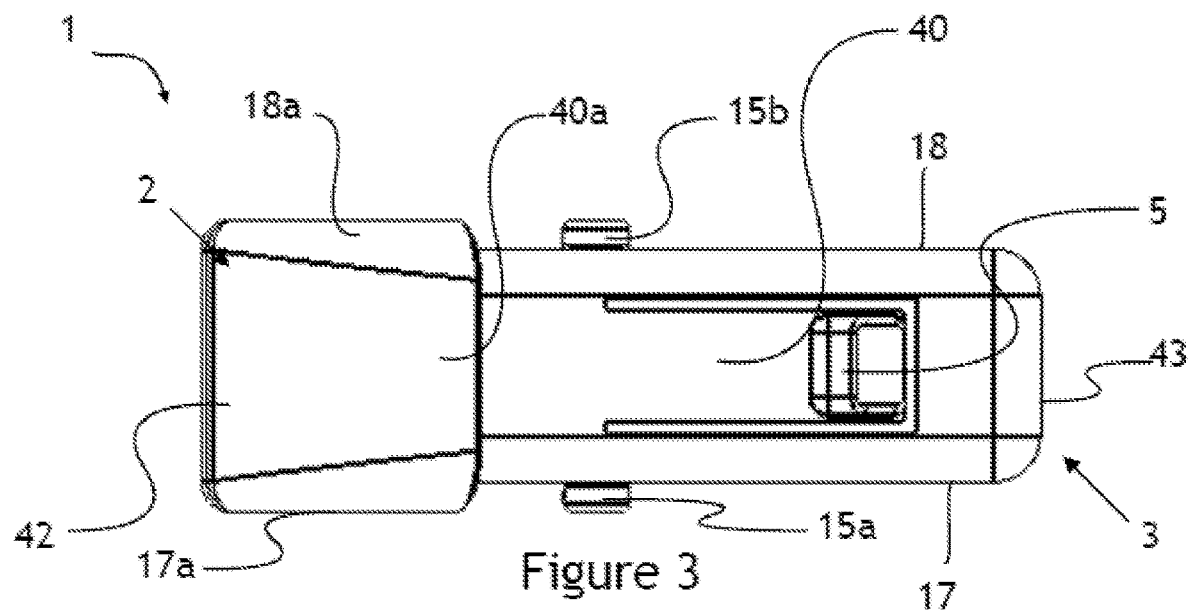
FIG. 3 is a top view of the connector shown in FIG. 1.

FIG. 3 is a top view of the embodiment of a connector 1 illustrated in FIGS. 1 and 2. As illustrated, the opposing side walls 17, 18 and/or the top surface 40 of the connector may be raised and/or wider a long a portion of the front end 2 (designated as 17a, 18a, and 40a) than they are at the back end 3 or at the guide pins 15a, 15b.

Figure 4:
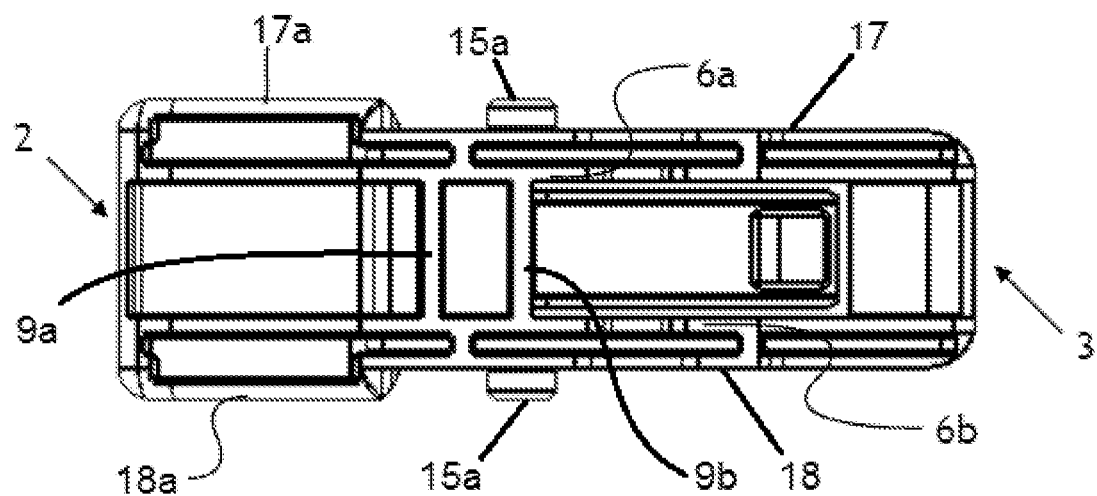
FIG. 4 is a bottom view of the connector shown in FIG. 1.

FIG. 4 is a bottom view of the embodiment of a connector 1 illustrated in FIGS. 1, 2, and 3. As illustrated, the internal support structure may have at least two longitudinal internal support walls 6a, 6b, and may further have one or more transverse internal support walls 9a, 9b. FIG. 4 also illustrates the raised opposing side walls 17a, 17b that may be configured such that the front end 2 of the connector 1 is wider than the back end 3.

Figure 5:
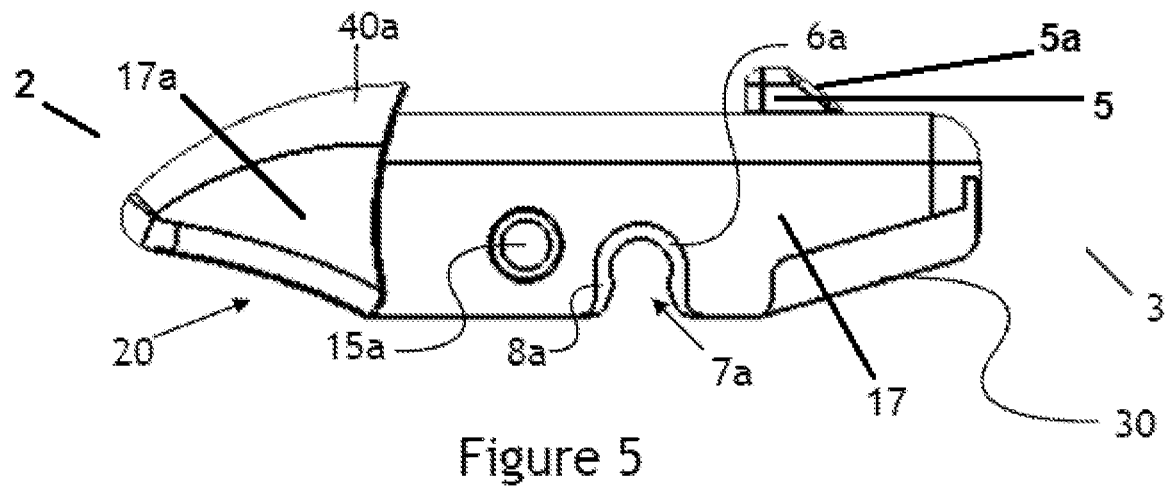
FIG. 5 is a side view of the connector shown in FIG. 1.
Figure 6:
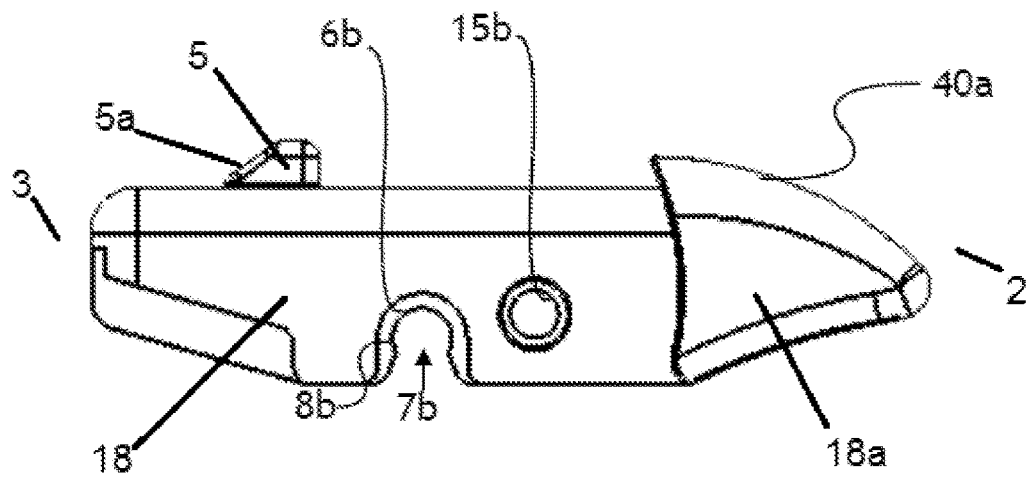
FIG. 6 is an opposing side view of the connector shown in FIG. 1.

FIGS. 5 and 6 are opposing side views of the embodiment of a connector 1 illustrated in FIGS. 1-4. As illustrated, the opposing side walls 17, 18 may have at least one rivet passage 7a, 7b and arcuate rivet clip 8a, 8b in each of the internal longitudinal support walls 6a, 6b for accepting and securing a rivet of a wiper blade mount to secure the connector 1 to a wiper blade. FIGS. 5 and 6 also illustrate the raised portion of the top surface 40a towards the front end 2. As further illustrated, the raised portion of the top surface 40a slopes downwards towards the front end 2. As also illustrated, the bottom portions 20, 30 of the front and back ends, respectively, of the connector 1 may be sloped upwards towards the top surface 40. This may allow for some freedom of movement of the wiper blade along the axis of the rivet as it pivots thereon.

Figure 7:
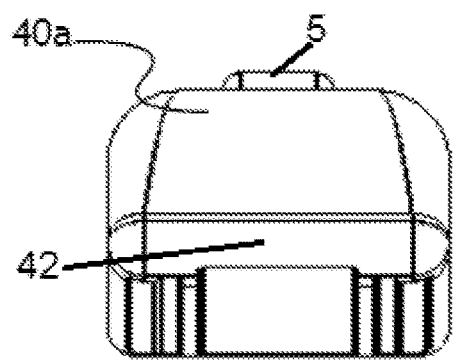
FIG. 7 is front end view of the connector shown in FIG. 1.
Figure 8:
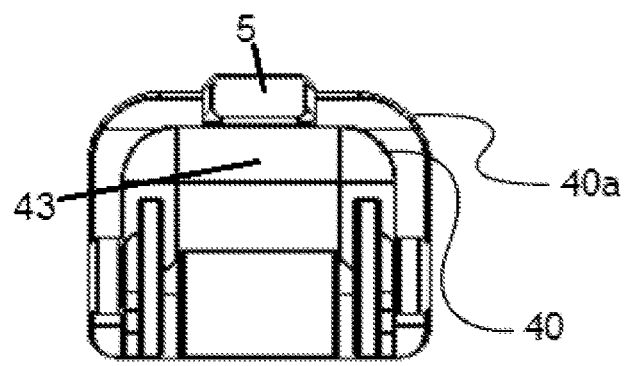
FIG. 8 is a back end view of the connector shown in FIG. 1.

FIG. 7 illustrates a front view of the embodiment of a connector 1 from the front end illustrated in FIGS. 1-6. FIG. 8 illustrates a back view of the embodiment of a connector 1 from the distal end illustrated in FIGS. 1-6. FIGS. 7 and 8 show the locking tab 5 extending upwards from the top surface 40 of the connector 1.

FIG. 9 illustrates an embodiment of a connector 1 of the disclosure as attached to a mounting base MB of a wiper blade WB. The wiper blade may be a traditional wiper blade having tournament style brackets that act as a force distribution structure. Alternatively, the wiper blade may be a beam blade, which uses one or more spring-elastic beams as a force distribution structure. Alternatively, a hybrid wiper blade which uses one or more beams and one or more brackets to distribute force to a wiper blade may also be used.

Figure 10:
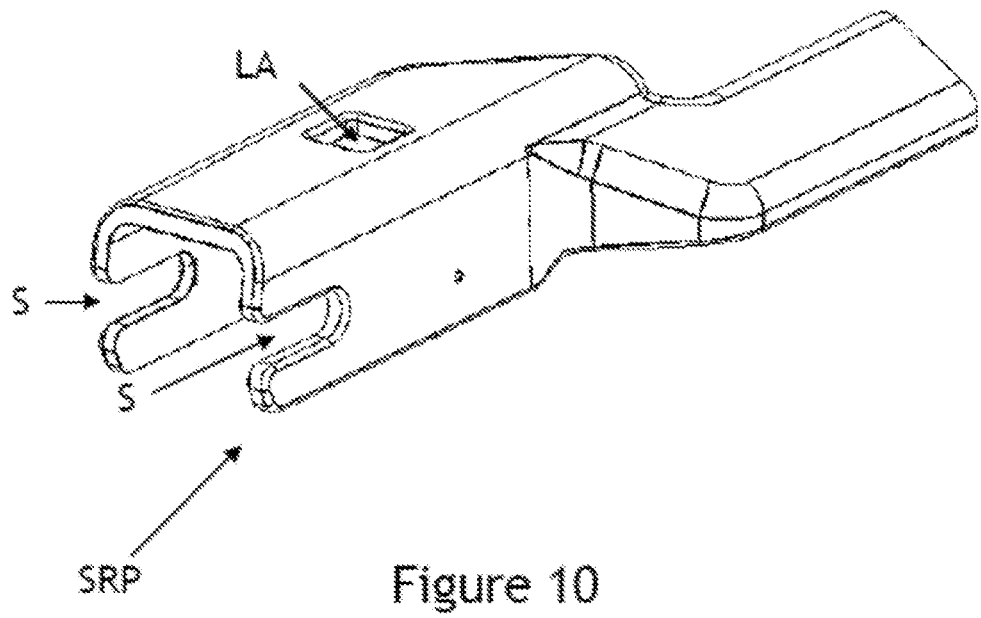
FIG. 10 is a top perspective view of a windshield wiper arm for receiving a connector of the disclosure.

FIG. 10 illustrates a slotted receiving portion SRP of a windshield wiper arm for engaging a connector 1 of the present disclosure. The slotted receiving portion SRP has slots S on opposing sides for engaging the guide pins 15a, 15b of a connector 1 of the disclosure. The slotted receiving portion SRP may also have a locking aperture LA for engaging the locking tab 5 of a connector 1 described herein.

Figure 11:
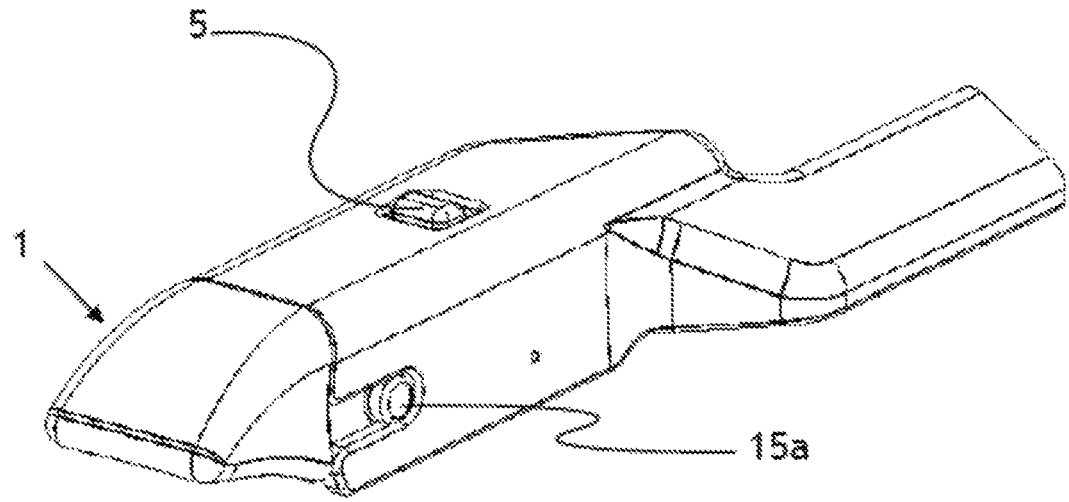
FIG. 11 is a top perspective view of the connector shown in FIG. 1 engaging the wiper arm of FIG. 10.

FIG. 11 illustrates a slotted receiving portion SRP of a windshield wiper arm with a connector 1 pushed completely into the slotted receiving portion SRP. The guide pins 15a, 15b on the opposing peripheral side walls 4 provide a structure for assisting in maintaining proper positioning of the connector 1 while slideably engaging the slots S of the wiper arm's slotted receiving portion SRP. The guide pins 15a, 15b also provide proper positioning of the connector 1 as it is slideably placed into the receiving portion of the windshield wiper arm, upon which the locking tab engages the locking aperture to finally maintain the position of the connector on the wiper arm. The locking tab 5 protrudes into the locking aperture LA of the receiving portion to "lock" the connector 1 into place.

Figure 12:
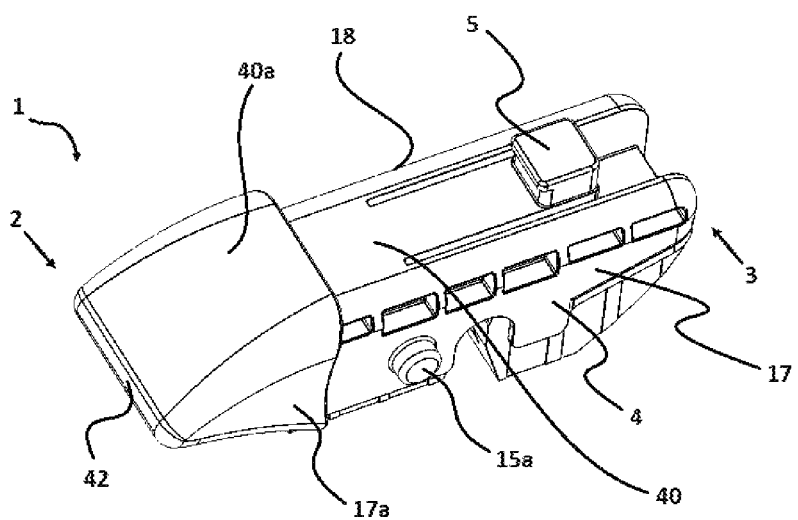
FIG. 12 is a top perspective view of an embodiment of a connector of the disclosure.

FIG. 12 illustrates a top perspective view of an embodiment of a connector 1 of the disclosure. The connector 1 has a front end 2 and a back end 3. For purposes of this disclosure, the back end 3 of the connector receives the wiper arm, and the front end 2 of the connector is opposite the back end 3. A peripheral wall 4 may extend around the periphery of the connector 1. The peripheral wall 4 may include a front portion 42, a back portion 43, and opposing side portions that connect the front and back portions, referred to as a first side 17 and a second side 18. A top surface 40 extends between opposing peripheral side walls 17, 18.

The opposing peripheral side walls 17, 18 may each have a guide pin 15a, 15b, and the pins may be sized to be capable of slideably engaging slots on slotted receiving portions of a windshield wiper arm. In some embodiments, a front portion of the opposing side walls 17a, 18a and/or a front portion of the top surface 40a of the connector may be raised relative to the respective back portions of the opposing side walls 17, 18, and top surface 40. Further, in some embodiments, at least a portion of the top surface 40 may be lower relative to the opposing side walls 117, 118 of the back portion 43. The front portions of the opposing side walls 17a, 18a define a front width, and in some embodiments the front width may be greater than the width of the opposing side walls 17, 18 at the back end of the connector 1. Similarly, in some embodiments the front width may be greater than the width of the opposing side walls 17, 18 at the guide pins 15a, 15b. The raised and/or wider side walls 17a, 18a and/or top surface 40a may provide a structure for the windshield wiper arm receiving portion to abut when engaged with the connector 1. Further, the raised and/or wider side walls and/or top surface 40a of the connector may provide a streamlined transition surface where the receiving portion of the wiper arm and front end of the connector 1 meet. In further embodiments, the connector 1 slopes downward from the proximity of the abutment with the receiving portion of the wiper arm towards the front end 2, further providing a streamlined profile at the connector-wiper arm junction.

The top surface 40 of the connector 1 may also have a locking tab 5 in the top surface 40 sized such that it is capable of engaging a locking aperture LA (see FIG. 10) on the top surface of the slotted receiving portion SRP of a windshield wiper arm. In some embodiments, the locking tab 5 is cantilevered. The locking tab 5 may sit atop a locking tab ledge 11. The locking tab 5 may be structured with a locking tab lip 5a such that the locking aperture LA of the slotted receiving portion SRP receives the locking tab and abuts the locking tab lip 5a to assist in locking the connector 1 into place. The locking tab lip 5a may extend in the direction of the front portion 2 of the connector 1. Once the connector 1 is pushed completely into the slotted receiving portion SRP, the locking tab 5 protrudes into the locking aperture LA of the receiving portion and the locking tab lip 5a abuts the top surface of the slotted receiving portion SRP to help "lock" the connector 1 into place. In some embodiments, the locking tab ledge 11 is elevated relative to the top surface 40 of the back end of the connector 1.

The guide pins 15a, 15b on the opposing peripheral side walls 4 may provide a structure for assisting in maintaining proper positioning of the connector 1 while slidably engaging the wiper arm's slotted receiving portion SRP. The guide pins 15a, 15b also provide proper positioning of the connector 100 as it is slidably placed into the receiving portion of the windshield wiper arm, upon which the locking tab engages the locking aperture to finally maintain the position of the connector on the wiper arm.

Figure 13:
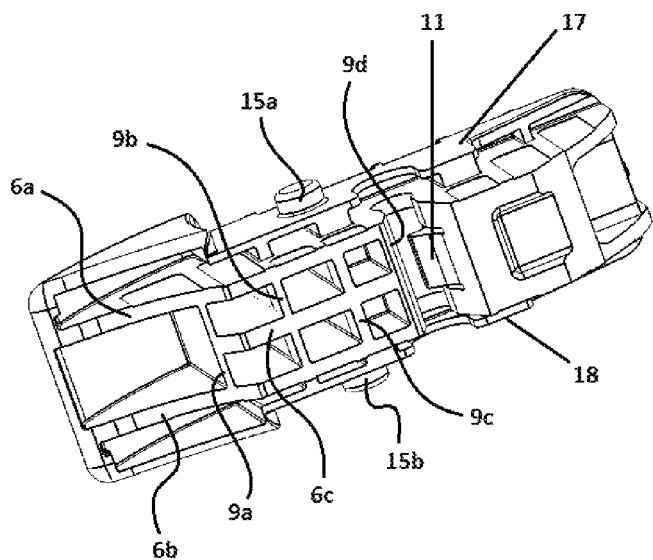
FIG. 13 is a bottom perspective view of the connector shown in FIG. 12.
Figure 15:
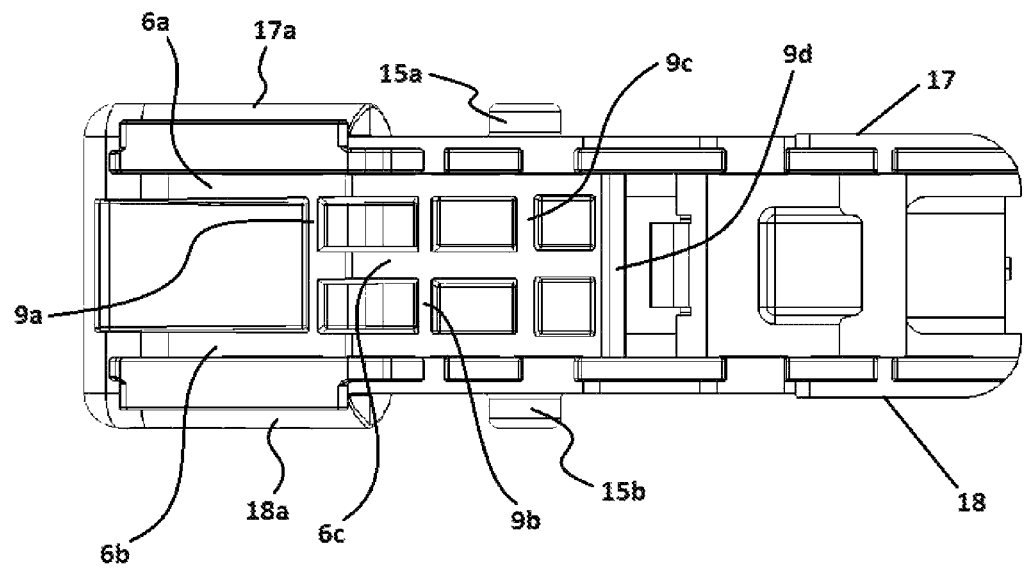
FIG. 15 is a bottom view of the connector shown in FIG. 12.
Figure 20:
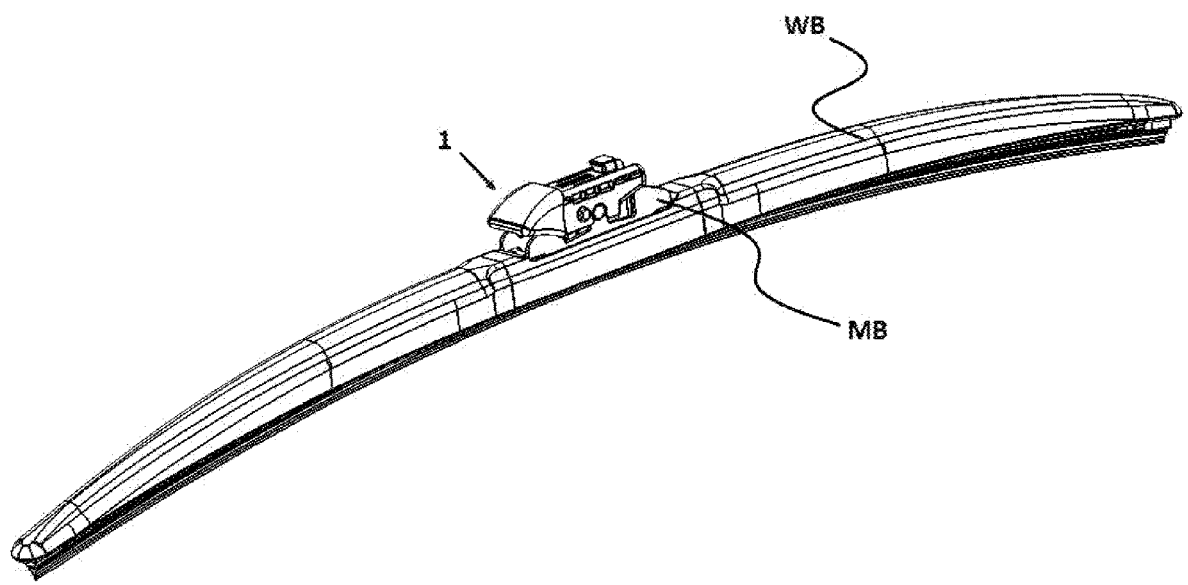
FIG. 20 is a top perspective view of the connector shown in FIG. 12 attached to a windshield wiper blade.

FIG. 13 illustrates a bottom perspective view of an embodiment of the connector 1 that shows the internal support structure may have at least three longitudinal internal support walls 6a, 6b, 6c extending downward from the top surface, and substantially along the longitudinal length of the connector 1. The connector 1 may also have at least one rivet passage 7a, 7b and arcuate rivet clip 8a, 8b (see FIGS. 16 and 17) in each of the internal longitudinal support walls 6a, 6b for accepting and securing a rivet of a wiper blade to secure the connector to the wiper blade. The support walls can extend substantially along the length of the connector continuously, or intermittently, having gaps along the way. In particular, internal support walls 6a, 6b provide rigidity and structural strength to the connector 1. In some of these embodiments, the connector may be capable of being secured to the mounting base of a windshield wiper blade assembly via the rivet through the mounting base, as shown in FIG. 20. In some embodiments, the connector 1 may have at least one transverse internal support wall 109 (four walls 9a, 9b, 9c, 9d are shown in FIG. 15) connecting the three longitudinal internal support walls 6a, 6b, 6c and providing additional support and rigidity to the connector.

Figure 16:
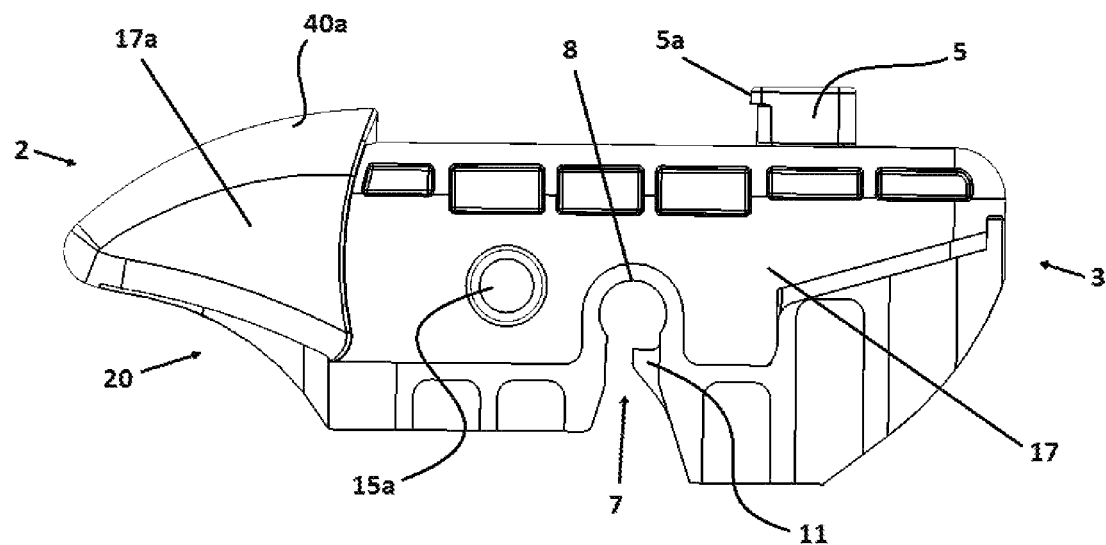
FIG. 16 is a side view of the connector shown in FIG. 12.
Figure 17:
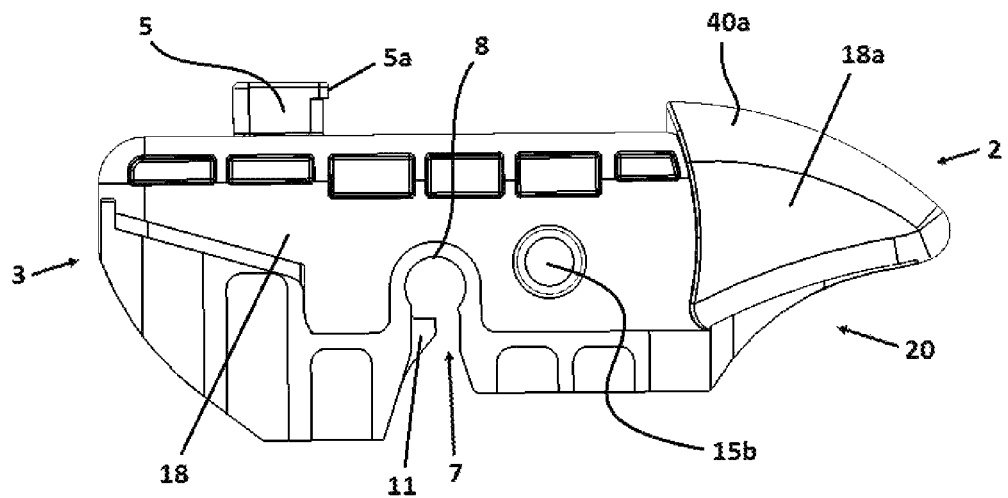
FIG. 17 is an opposing side view of the connector shown in FIG. 12.

In some embodiments, the connector 1 may also have a rivet clasp 11 along the at least one rivet passage 7 and also an arcuate rivet clip 8 (see FIGS. 16 and 17) in the internal support walls for accepting and semi-permanently securing a rivet of a wiper blade to secure the connector to the wiper blade. FIGS. 16 and 17 further illustrate a rivet clasp 11 for semi-permanently securing the rivet of a wiper blade mount to the connector 1.

Those skilled in the art will recognize that connector 1 can be fabricated from any suitable material known in the art, including without limitation, rigid or elastic plastics, metals, synthetic and natural rubber compounds, etc. However, certain embodiments contemplate materials that can be molded such that connector 1 is fabricated as a single piece. In other embodiments the connector can be fabricated in multiple pieces. For instance the wider front portion of the connector 1 may be fabricated as a separate cap which engages and is secured to the back portion of the connector through projections and recesses, detents that engage shoulders, or through any other known method of securing a cap to a connector known in the art.

Figure 14:
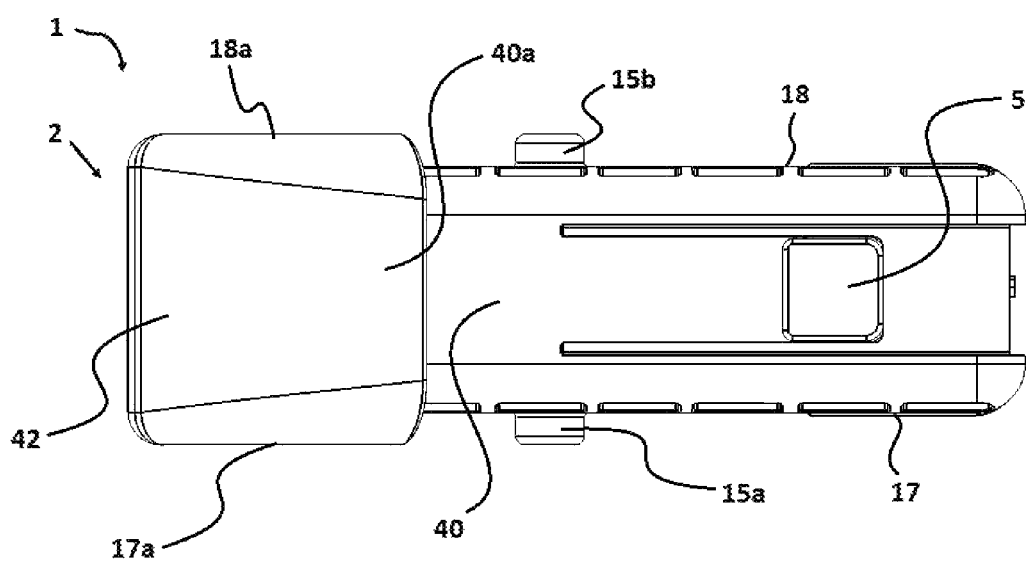
FIG. 14 is a top view of the connector shown in FIG. 12.

FIG. 14 is a top view of the embodiment of a connector 1 illustrated in FIGS. 12 and 13. As illustrated, the opposing side walls 17, 18 and/or the top surface 40 of the connector may be raised and/or wider along a portion of the front end 2 (designated as 17a, 18a, and 40a) than they are at the back end 3 or at the guide pins 15a, 15b. Further, as illustrated, the top surface 40 (designated 40b) may be lower along a portion of the back end 3 of the connector than at the front end 2.

FIG. 15 is a bottom view of the embodiment of a connector 1 illustrated in FIGS. 12, 13, and 14. As illustrated, the internal support structure may have at least two longitudinal internal support walls 6a, 6b, 6c and may further have one or more transverse internal support walls 9a, 9b, 9c, 9d. At least one of the longitudinal internal support walls 6c may not fully extend the entire length of the connector 1. For example, internal support wall 6c may extend from transverse internal support wall 9a to transverse internal support wall 9d. FIG. 15 also illustrates the raised opposing side walls 17a, 17b that may be configured such that the front end 2 of the connector 1 is wider than the back end 3.

FIGS. 16 and 17 are opposing side views of the embodiment of a connector 1 illustrated in FIGS. 12-15. As illustrated, the opposing side walls 17, 18 may have at least one rivet passage 7a, 7b and arcuate rivet clip 8a, 8b in each of the internal longitudinal support walls 6a, 6b, 6c for accepting and securing a rivet of a wiper blade mount to secure the connector 100 to a wiper blade. FIGS. 16 and 17 also illustrate the raised portion of the top surface 40a towards the front end 2. As further illustrated, the raised portion of the top surface 40a slopes downwards towards the front end 2. As also illustrated, the bottom portion 20 of the front end of the connector 1 may be sloped upwards towards the top surface 40. Likewise, as also illustrated, the bottom portion 30 of the back end of the connector 1 may curve as it extends from the bottom to the top surface 40. This may allow for some freedom of movement of the wiper blade along the axis of the rivet as it pivots thereon.

Figure 18:
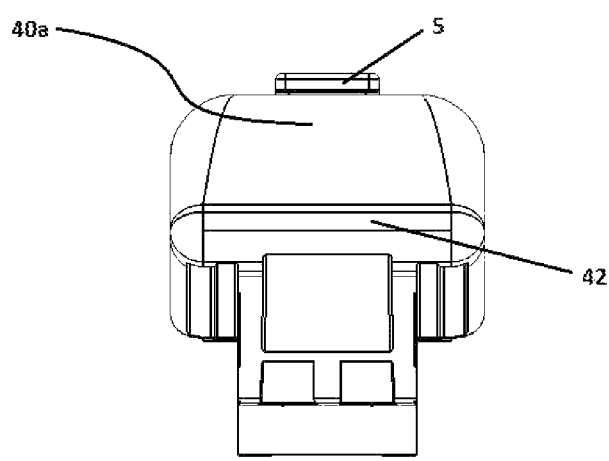
FIG. 18 is front end view of the connector shown in FIG. 12.
Figure 19:
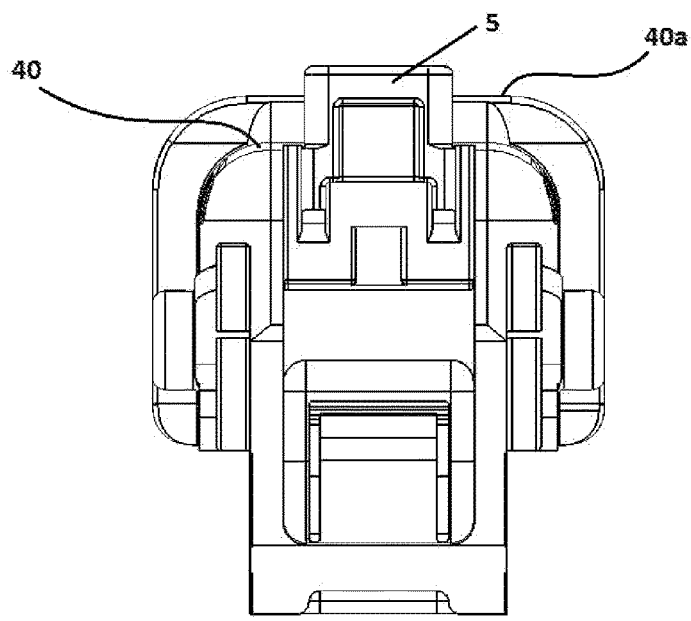
FIG. 19 is a back end view of the connector shown in FIG. 12.

FIG. 18 illustrates a front view of the embodiment of a connector 100 from the front end illustrated in FIGS. 12-17. FIG. 19 illustrates a back view of the embodiment of a connector 1 from the distal end illustrated in FIGS. 12-18. FIGS. 18 and 19 show the locking tab 5 extending upwards from the top surface 40 of the connector 1.

FIG. 20 illustrates an embodiment of a connector 1 of the disclosure as attached to a mounting base MB of a wiper blade WB. The wiper blade may be a known wiper blade having tournament style brackets that act as a force distribution structure. Alternatively the wiper blade may be a beam blade, which uses one or more spring-elastic beams as a force distribution structure. Alternatively, a hybrid wiper blade which uses one or more beams and one or more brackets to distribute force to a wiper blade may also be used.

Figure 21:
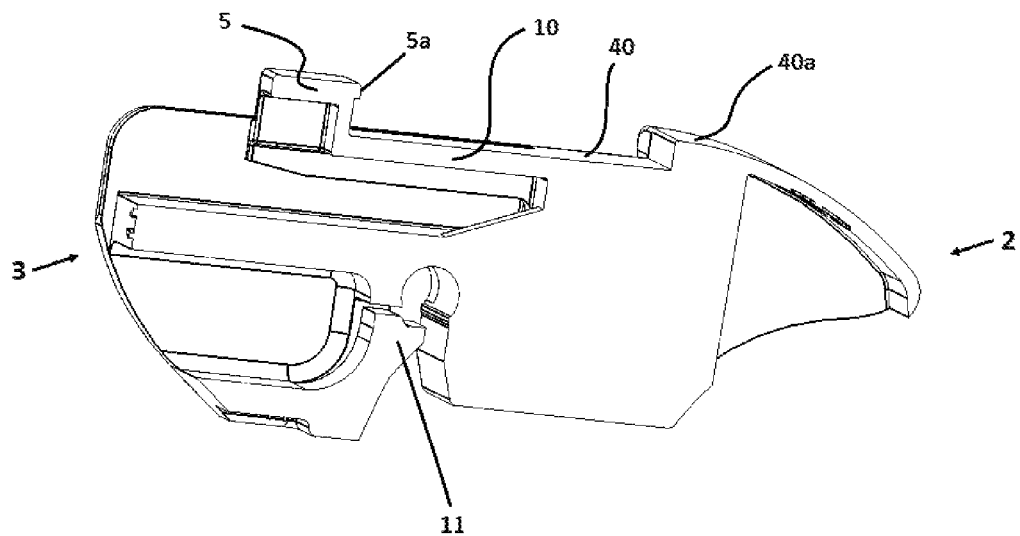
FIG. 21 is a longitudinal cross section view of the connector shown in FIG. 12.

FIG. 21 illustrates a longitudinal section view of a connector 1 of the disclosure showing a cantilevered rivet clasp 11 for accepting and semi-permanently securing a rivet of a wiper blade to secure the connector to the wiper blade. FIG. 21 also illustrates the locking tab 5 with a locking tab lip 5a, the locking tab 5 also structured as a cantilevered element.

Figure 22:
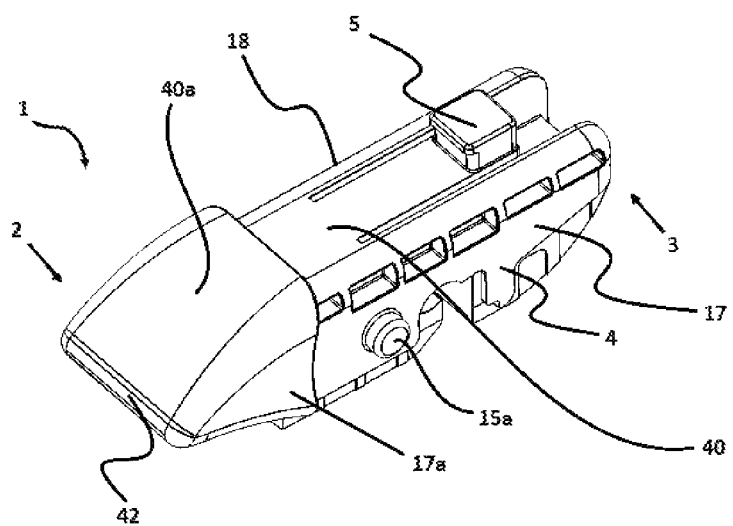
FIG. 22 is a top perspective view of an embodiment of a connector of the disclosure.

FIG. 22 illustrates a top perspective view of an embodiment of a connector 1 of the disclosure. The connector 1 has a front end 2 and a back end 3. For purposes of this disclosure, the back end 3 of the connector receives the wiper arm, and the front end 2 of the connector is opposite the back end 3. A peripheral wall 4 may extend around the periphery of the connector 1. The peripheral wall 4 may include a front portion 42, a back portion 43, and opposing side portions that connect the front and back portions, referred to as a first side 17 and a second side 18. A top surface 40 extends between opposing peripheral side walls 17, 18.

The opposing peripheral side walls 17, 18 may each have a guide pin 15a, 15b, the pins are sized to be capable of slidably engaging slots on slotted receiving portions of a windshield wiper arm. In some embodiments, the front portions of the opposing side walls 17a, 218a and/or the front portions of the top surface 40a of the connector may be raised relative to the respective back portions of the opposing side walls 17, 18, and top surface 40. Further, in some embodiments, the top surface 40b may be lower relative to the opposing side walls 17b, 18b of the back portion 43. In some embodiments, the front portions of the opposing side walls 17a, 18a, may define a width which is greater than the width of the opposing side walls 17, 18 at the back end of the connector 1. Similarly, in some embodiments the front portions of the opposing side walls 17a, 18a, may define a width which is greater than the width of the opposing side walls 17, 18 at the guide pins 15a, 15b. The raised and/or wider side walls 17a, 18a and/or top surface 40a may provide a structure for the windshield wiper arm receiving portion to abut when engaged with the connector 1. Further, the raised and/or wider side walls and/or top surface 40a of the connector may provide a streamlined transition surface where the receiving portion of the wiper arm and front end of the connector 1 meet. In further embodiments, the connector 1 slopes downward from the proximity of the abutment with the receiving portion of the wiper arm towards the front end 2, further providing a streamlined profile at the connector-wiper arm junction.

The top surface 40 of the connector 1 may also have a locking tab 5 in the top surface 40 sized such that it is capable of engaging a locking aperture LA (see FIG. 10) on the top surface of the slotted receiving portion SRP of a windshield wiper arm. In some embodiments, the locking tab 5 is cantilevered. The locking tab 2 sits atop a locking tab ledge 10. The locking tab 5 may be structured with a locking tab lip 5a such that the locking aperture LA of the slotted receiving portion SRP receives the locking tab and abuts the locking tab lip 5a to assist in locking the connector 1 into place. The locking tab lip 5a may extend in the direction of the front portion 2 of the connector 1. Once the connector 1 is pushed completely into the slotted receiving portion SRP, the locking tab 205 protrudes into the locking aperture LA of the receiving portion and the locking tab lip 5a abuts the top surface of the slotted receiving portion SRP to help "lock" the connector 1 into place. In some embodiments, the locking tab ledge 10 is elevated relative to the top surface 40b of the back end of the connector 1.

The guide pins 15a, 15b on the opposing peripheral side walls 4 may provide a structure for assisting in maintaining proper positioning of the connector 1 while slidably engaging the wiper arm's slotted receiving portion SRP. The guide pins 15a, 15b also provide proper positioning of the connector 1 as it is slidably placed into the receiving portion of the windshield wiper arm, upon which the locking tab engages the locking aperture to finally maintain the position of the connector on the wiper arm.

Figure 23:
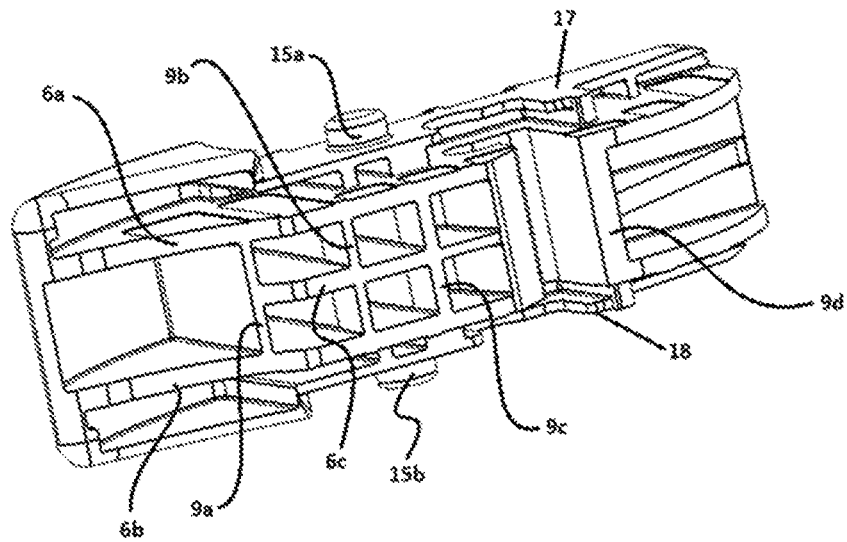
FIG. 23 is a bottom perspective view of the connector shown in FIG. 22.
Figure 30:
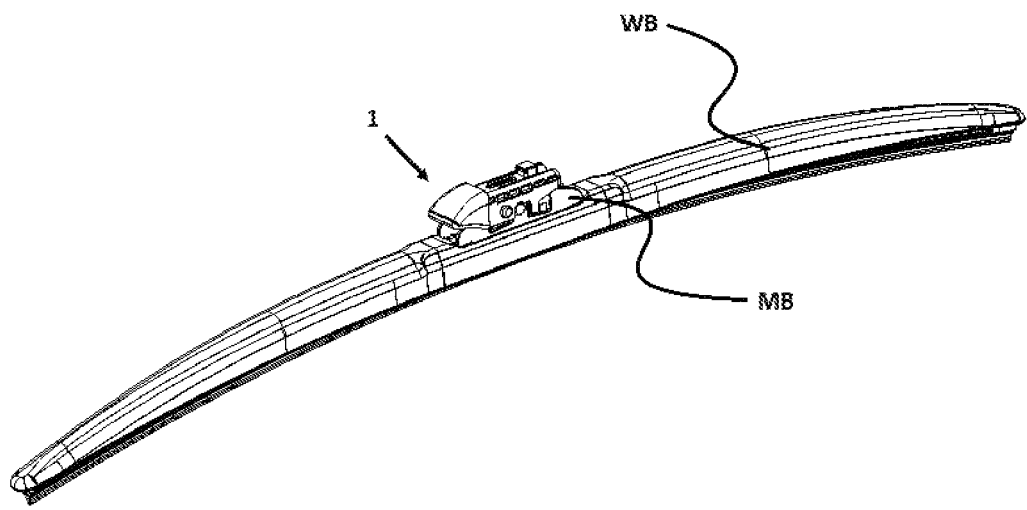
FIG. 30 is a top perspective view of the connector shown in FIG. 22 attached to a windshield wiper blade.

FIG. 23 illustrates a bottom perspective view of an embodiment of the connector 200 that shows the internal support structure having at least three longitudinal internal support walls 6a, 6b, 6c extending downward from the top surface, and substantially along the longitudinal length of the connector 200. The connector 200 may also have at least one rivet passage 207a, 207b and an arcuate rivet clip 8 (see FIGS. 26 and 27) in the rivet shelf for accepting and securing a rivet of a wiper blade to secure the connector to the wiper blade. The support walls can extend substantially along the length of the connector continuously, or intermittently, having gaps along the way. In particular, internal support walls 6a, 6b, 6c provide rigidity and structural strength to the connector 1. In some of these embodiments, the connector may be capable of being secured to the mounting base of a windshield wiper blade assembly via the rivet through the mounting base, as shown in FIG. 30. In some embodiments, the connector 1 may have at least one transverse internal support wall 9 (four walls 9a, 9b, 9c, 9d are shown in FIG. 23) connecting the three longitudinal internal support walls 6a, 6b, 6c and providing additional support and rigidity to the connector.

Those skilled in the art will recognize that connector 1 can be fabricated from any suitable material known in the art, including without limitation, rigid or elastic plastics, metals, synthetic and natural rubber compounds, etc. However, certain embodiments contemplate materials that can be molded such that connector 200 is fabricated as a single piece. In other embodiments the connector can be fabricated in multiple pieces. For instance the wider front portion of the connector 1 may be fabricated as a separate cap which engages and is secured to the back portion of the connector through projections and recesses, detents that engage shoulders, or through any other known method of securing a cap to a connector known in the art.

Figure 24:
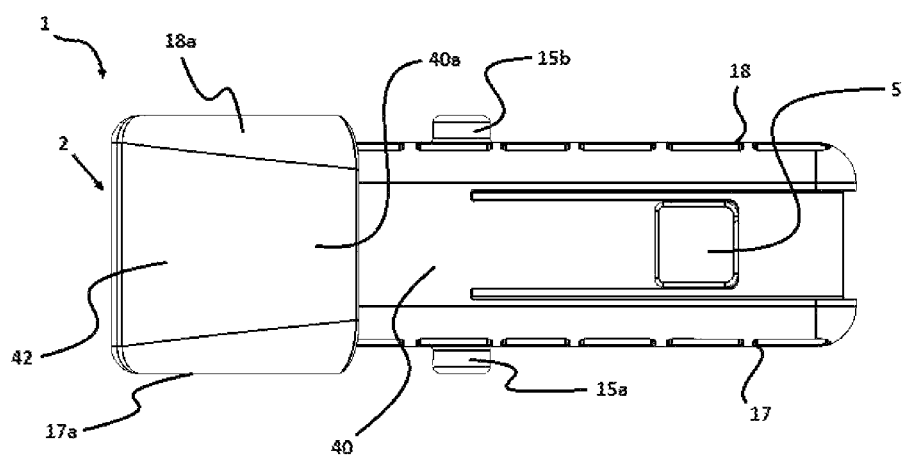
FIG. 24 is a top view of the connector shown in FIG. 22.

FIG. 24 is a top view of the embodiment of a connector 1 illustrated in FIGS. 22 and 23. As illustrated, the opposing side walls 17, 18 and/or the top surface 40 of the connector may be raised and/or wider a long a portion of the front end 2 (designated as 17a, 18a, and 40a) than they are at the back end 3 or at the guide pins 15a, 15b.

Figure 25:
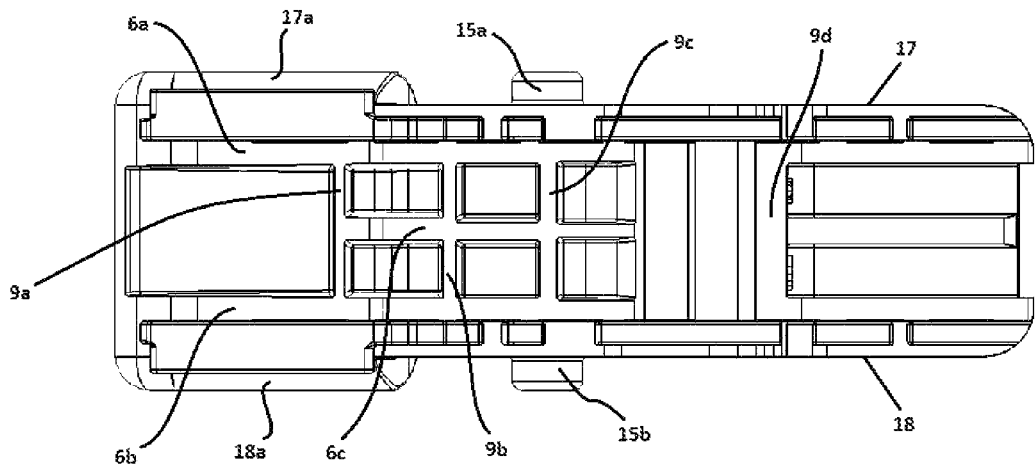
FIG. 25 is a bottom view of the connector shown in FIG. 22.

FIG. 25 is a bottom view of the embodiment of a connector 1 illustrated in FIGS. 22, 23, and 24. As illustrated, the internal support structure may have at least two longitudinal internal support walls 6a, 6b, and may further have one or more transverse internal support walls 9a, 9b. FIG. 24 also illustrates the raised opposing side walls 17a, 17b that may be configured such that the front end 2 of the connector 1 is wider than the back end 3.

Figure 26:
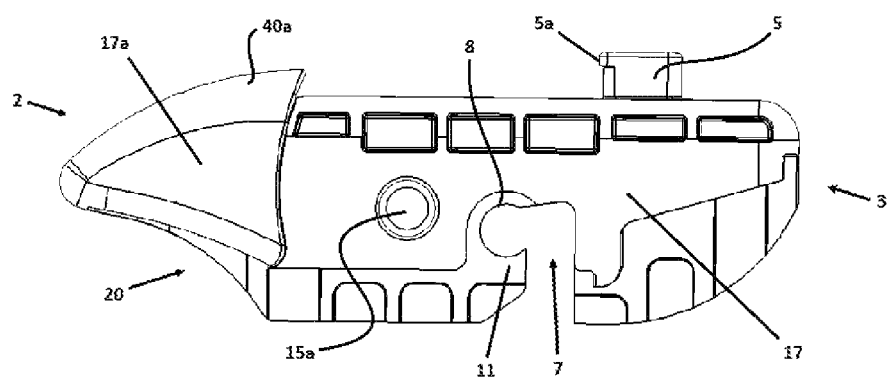
FIG. 26 is a side view of the connector shown in FIG. 22.
Figure 27:
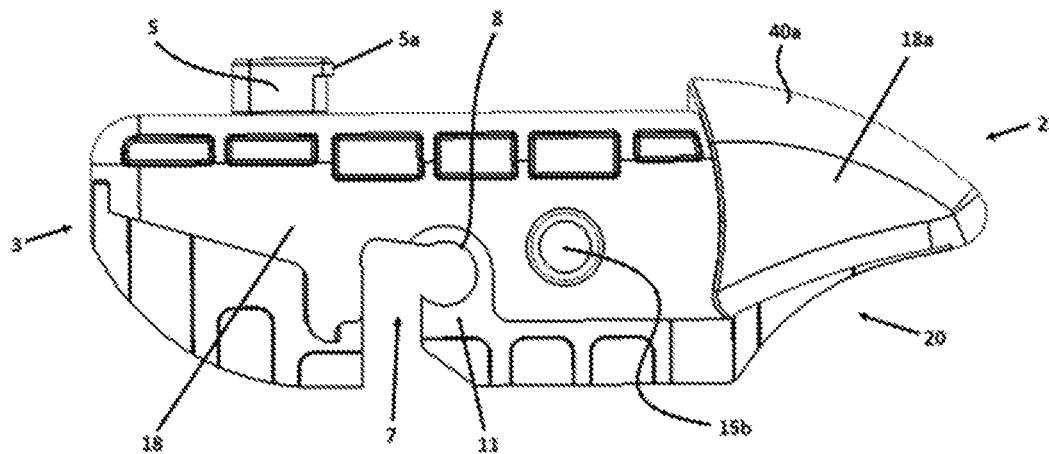
FIG. 27 is a side view of the connector shown in FIG. 22.

FIGS. 26 and 27 are opposing side views of the embodiment of a connector 1 illustrated in FIGS. 22-25. As illustrated, the opposing side walls 17, 18 may have at least one rivet passage 7a, 7b and arcuate rivet clip 8a, 8b for accepting and securing a rivet of a wiper blade mount to secure the connector 1 to a wiper blade. FIGS. 26 and 27 also illustrate the raised portion of the top surface 40a towards the front end 2. As further illustrated, the raised portion of the top surface 40a slopes downwards towards the front end 2. As also illustrated, the bottom portions 20, 30 of the front and back ends, respectively, of the connector 1 may be sloped upwards towards the top surface 40. Likewise, as also illustrated, the bottom portion 30 of the back end of the connector 1 may curve as it extends from the bottom to the top surface 40. This may allow for some freedom of movement of the wiper blade along the axis of the rivet as it pivots thereon.

Figure 28:
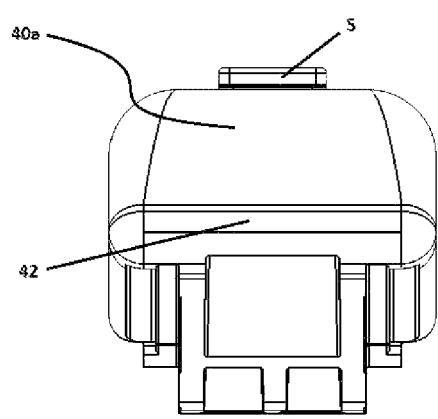
FIG. 28 is front end view of the connector shown in FIG. 22.
Figure 29:
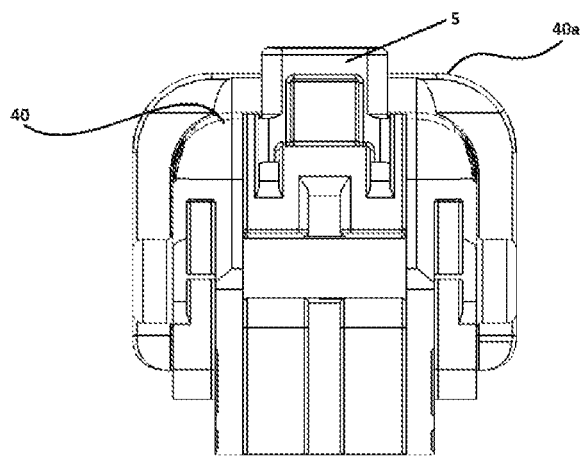
FIG. 29 is a back end view of the connector shown in FIG. 22.

FIG. 28 illustrates a front view of the embodiment of a connector 1 from the front end illustrated in FIGS. 22-27. FIG. 29 illustrates a back view of the embodiment of a connector 200 from the distal end illustrated in FIGS. 22-28. FIGS. 28 and 29 show the locking tab 5 extending upwards from the top surface 40 of the connector 1.

FIG. 30 illustrates an embodiment of a connector 1 of the disclosure as attached to a mounting base MB of a wiper blade WB. The wiper blade may be a traditional wiper blade having tournament style brackets that act as a force distribution structure. Alternatively the wiper blade may be a beam blade, which uses one or more spring-elastic beams as a force distribution structure. Alternatively, a hybrid wiper blade which uses one or more beams and one or more brackets to distribute force to a wiper blade may also be used.

In certain embodiments, the connector 1 may be connected to the wiper blade prior to connecting to the wiper arm. In certain embodiments, the connector 1 may be connected to the wiper arm prior to being connected to the wiper blade. In certain embodiments, the connector 1 may either be first connected to the wiper arm or to the wiper arm.

Those skilled in the art will recognize that while the invention will most likely be used in conjunction with automobiles, it is suitable for use with any vehicle. For example, in addition to automobiles, trucks, buses, locomotives, aircrafts, or any other vehicle type that uses a windshield wiper can benefit from the invention.

While specific embodiments have been discussed to illustrate the invention, it will be understood by those skilled in the art that the descriptions herein are intended as illustrative, and not as limiting, and that variations in the embodiments can be made without departing from the spirit of the invention.

For example, any suitable material can be used to manufacture the connectors of the present disclosure. The number or position of the locking tabs, guide pins, or other mechanisms can vary so long as they are capable of performing their intended function.

I claim:

1. A connector comprising:
a front end and a longitudinally opposed back end;
a peripheral wall having at least two opposing peripheral side walls and a top surface extending from one of the two opposing peripheral side walls to the other, the opposing peripheral side walls each comprising a guide pin longitudinally spaced a distance from the front end and projecting outwardly in a lateral direction along a lateral axis;
an internal support wall provided between the two opposing peripheral side walls, the internal support wall positioned longitudinally along the connector and intersecting the lateral axis;
an additional internal support wall, wherein the internal support wall and the additional internal support wall extend downward from the top surface, and substantially along the longitudinal length of the connector;
at least one rivet passage and arcuate rivet clip in each of the internal support wall and additional internal support wall for accepting and securing a rivet of a wiper blade, thereby securing the connector to the wiper blade; and
a locking tab extending outward from the top surface, the locking tab having a lip extending outward from a first side of the locking tab,
wherein the pins are sized to be capable of slideably engaging slots on slotted receiving portions of a windshield wiper arm.

2. The connector of claim 1 wherein the opposing side walls and/or the top surface of the connector is raised along a portion of the front end, wherein the raised side walls and/or top surface provide an abutment structure capable of abutting the windshield wiper arm receiving portion when the arm is engaged with the connector.

3. The connector of claim 2 wherein the raised side walls and/or top surface of the connector provide a streamlined transition surface where the receiving portion of the wiper arm and front end of the connector meet.

4. The connector of claim 2 wherein the connector slopes downward from the proximity of the abutment structure towards the front end, further providing a streamlined look at the connector-wiper arm junction.

5. The connector of claim 1, wherein the locking tab is capable of engaging a locking aperture on a top surface of the slotted receiving portion of the windshield wiper arm.

6. The connector of claim 5 wherein the lip extends over a portion of the top surface of the slotted receiving portion of the windshield wiper arm when engaged in a locking aperture.

7. The connector of claim 1 wherein the guide pins on the opposing peripheral side walls are capable of assisting in maintaining proper positioning of the connector while slideably engaging the wiper arm and providing proper positioning of the connector as it is slideably placed into the receiving portion of the windshield wiper arm, upon which the locking tab engages the locking aperture to finally maintain the position of the connector on the wiper arm.

8. A wiper blade assembly comprising:
a wiper strip;
a force distribution structure; and
a connector having a front end and a longitudinally opposed back end, and comprising:
a peripheral wall having at least two opposing peripheral side walls and a top surface extending from one of the two opposing peripheral side walls to the other, the opposing peripheral side walls each comprising a guide pin longitudinally spaced a distance from the front end and projecting outwardly in a lateral direction along a lateral axis;
an internal support wall provided between the two opposing peripheral side walls, the internal support wall positioned longitudinally along the connector and intersecting the lateral axis;
an additional internal support wall, wherein the internal support wall and the additional internal support wall extends downward from the top surface, and substantially along the longitudinal length of the connector;
at least one rivet passage and arcuate rivet clip in each of the internal support wall and additional internal support wall for accepting and securing a rivet of a wiper blade, thereby securing the connector to the wiper blade; and
a locking tab extending upwardly from the top surface, the locking tab having a lip extending outward from a first side of the locking tab,
wherein the pins are sized to be capable of slideably engaging slots on slotted receiving portions of a windshield wiper arm.

9. The wiper blade assembly of claim 8 wherein the opposing side walls and/or the top surface of the connector is raised along a portion of the front end, wherein the raised side walls and/or top surface provide an abutment structure capable of abutting the windshield wiper arm receiving portion when the arm is engaged with the connector.

10. The wiper blade assembly of claim 9 wherein the raised side walls and/or top surface of the connector provide a streamlined transition surface where the receiving portion of the wiper arm and front end of the connector meet.

11. The wiper blade assembly of claim 9 wherein the connector slopes downward from the proximity of the abutment structure towards the front end, further providing a streamlined look at the connector-wiper arm junction.

12. The wiper blade assembly of claim 8 wherein the locking tab is capable of engaging a locking aperture on a top surface of the slotted receiving portion of the windshield wiper arm.

13. The wiper blade assembly of claim 12 wherein the lip extends over a portion of the top surface of the slotted receiving portion of the windshield wiper arm when engaged in a locking aperture.

14. The wiper blade assembly of claim 8 wherein the guide pins on the opposing peripheral side walls are capable of assisting in maintaining proper positioning of the connector while slideably engaging the wiper arm and providing proper positioning of the connector as it is slideably placed into the receiving portion of the windshield wiper arm, upon which the locking tab engages the locking aperture to finally maintain the position of the connector on the wiper arm.

15. A connector comprising:

a front end and a longitudinally opposed back end;

a peripheral wall having at least two opposing peripheral side walls and a top surface extending from one of the two opposing peripheral side walls to the other, the opposing peripheral side walls each comprising a guide pin longitudinally spaced a distance from the front end and projecting outwardly in a lateral direction along a lateral axis;

an internal support wall provided between the two opposing peripheral side walls, the internal support wall positioned longitudinally along the connector and intersecting the lateral axis;

an additional internal support wall, wherein the internal support wall and the additional internal support wall extend downward from the top surface, and substantially along the longitudinal length of the connector;

a locking tab extending outward from the top surface, the locking tab having a lip extending outward from a first side of the locking tab; and at least one rivet passage, rivet shelf and arcuate rivet clip within the rivet shelf for accepting and securing a rivet of a wiper blade, thereby securing the connector to the wiper blade, wherein the pins are sized to be capable of slideably engaging slots on slotted receiving portions of a windshield wiper arm.

16. The connector of claim 15, wherein the locking tab is capable of engaging a locking aperture on a top surface of the slotted receiving portion of the windshield wiper arm, and the lip extends over a portion of the top surface of the slotted receiving portion of the windshield wiper arm when engaged in a locking aperture.

17. The connector of claim 15, wherein the guide pins on the opposing peripheral side walls are capable of assisting in maintaining proper positioning of the connector while slideably engaging the wiper arm and providing proper positioning of the connector as it is slideably placed into the receiving portion of the windshield wiper arm, upon which the locking tab engages the locking aperture to finally maintain the position of the connector on the wiper arm.

18. A wiper blade assembly comprising:
a wiper strip;
a force distribution structure; and
a connector having a front end and a longitudinally opposed back end, and comprising:
a peripheral wall having at least two opposing peripheral side walls and a top surface extending from one of the two opposing peripheral side walls to the other, the opposing peripheral side walls each comprising a guide pin longitudinally spaced a distance from the front end and projecting outwardly in a lateral direction along a lateral axis;
an internal support wall provided between the two opposing peripheral side walls, the internal support wall positioned longitudinally along the connector and intersecting the lateral axis;
an additional internal support wall, wherein the internal support wall and the additional internal support wall extends downward from the top surface, and substantially along the longitudinal length of the connector;
a locking tab extending upwardly from the top surface, the locking tab having a lip extending outward from a first side of the locking tab; and
at least one rivet passage, rivet shelf and arcuate rivet clip within the rivet shelf for accepting and securing a rivet of a wiper blade, thereby securing the connector to the wiper blade,
wherein the pins are sized to be capable of slideably engaging slots on slotted receiving portions of a windshield wiper arm.

19. The wiper blade assembly of claim 18, wherein the locking tab is capable of engaging a locking aperture on a top surface of the slotted receiving portion of the windshield wiper arm, and the lip extends over a portion of the top surface of the slotted receiving portion of the windshield wiper arm when engaged in a locking aperture.

20. The wiper blade assembly of claim 18, wherein the guide pins on the opposing peripheral side walls are capable of assisting in maintaining proper positioning of the connector while slideably engaging the wiper arm and providing proper positioning of the connector as it is slideably placed into the receiving portion of the windshield wiper arm, upon which the locking tab engages the locking aperture to finally maintain the position of the connector on the wiper arm.

\* \* \* \* \*